(12) United States Patent  
Valiani et al.

(10) Patent No.: US 9,219,597 B2
(45) Date of Patent: Dec. 22, 2015

(54) METHOD AND TRANSMISSION PROTOCOL FOR TRANSMISSION OF DATA AMONG DEVICES SHARING A COMMUNICATION CHANNEL

(75) Inventors: Massimo Valiani, Corciano (IT); Davide Tazzari, Loro Ciuffenna (IT); Filippo Vernia, La Spezia (IT)

(73) Assignee: ABB Technology AG, Zurich (CH)

( * ) Notice: Subject to any disclaimer, the term of this patent is extended or adjusted under 35 U.S.C. 154(b) by 53 days.

(21) Appl. No.: 13/981,067

(22) PCT Filed: Jan. 25, 2011

(86) PCT No.: PCT/IT2011/000019
§ 371 (c)(1),
(2), (4) Date: Sep. 3, 2013

(87) PCT Pub. No.: WO2012/101662
PCT Pub. Date: Feb. 8, 2012

(65) Prior Publication Data
US 2013/0336339 A1  Dec. 19, 2013

(51) Int. Cl.
*H04L 12/28* (2006.01)
*H04L 7/00* (2006.01)
(Continued)

(52) U.S. Cl.
CPC ............... *H04L 7/00* (2013.01); *H04L 12/403* (2013.01); *H04L 25/4902* (2013.01); *H04L 12/4135* (2013.01)

(58) Field of Classification Search
CPC ............. H04L 12/40; H04L 12/40019; H04L 12/40084; H04L 12/40156

USPC ......... 370/351, 386, 389, 400, 402, 403, 419; 709/227, 230, 245, 248, 253
See application file for complete search history.

(56) References Cited

U.S. PATENT DOCUMENTS 5,454,001 A * 9/1995 Nagatani et al. ............... 714/821
5,928,344 A * 7/1999 Stierli ........................... 710/105
(Continued)

OTHER PUBLICATIONS

CANPRES Version 2.0, Siemens, Oct. 1998, pp. 1-72.*
(Continued)

*Primary Examiner* — Dmitry H Levitan
(74) *Attorney, Agent, or Firm* — Patterson Intellectual Property Law, P.C.; Mark J. Patterson; Gary J. Montle

(57) ABSTRACT

A method is described for the transmission of data among devices ($D_1, D_2, \ldots D_i, \ldots D_n$) connected to a communication channel (1) through sequences containing at least two symbols, one dominant ("0") and one recessive ("1"). According to this transmission method, one ($D_{TSG}$) of the devices connected to the communication channel (1) has the function of time slot generator and it transmits on the communication channel (1) with a transmission frequency (f) a sequence of symbols, each defining a time slot in a sequence of time slots. The sequence of symbols comprises at least a series of recessive symbols ("1"). When one of the devices ($D_i$) has to transmit on the communication channel (1), it generates a sequence of symbols, synchronized with the sequence of time slots generated by the time slot generator device ($D_{TSG}$) and comprising at least one dominant symbol ("0").

41 Claims, 26 Drawing Sheets

(51) Int. Cl.
*H04L 12/403* (2006.01)
*H04L 25/49* (2006.01)
*H04L 12/413* (2006.01)

(56) References Cited

U.S. PATENT DOCUMENTS

| | | | | |
|---|---|---|---|---|
| 6,111,888 | A * | 8/2000 | Green et al. | 370/461 |
| 6,654,355 | B1 * | 11/2003 | Marbach et al. | 370/285 |
| 7,680,144 | B2 * | 3/2010 | Nichols | 370/451 |
| 7,769,932 | B2 * | 8/2010 | Nichols | 710/107 |
| 8,219,730 | B2 * | 7/2012 | Barrenscheen et al. | 710/117 |
| 8,650,356 | B2 * | 2/2014 | Wilson et al. | 711/104 |
| 2006/0123176 | A1 * | 6/2006 | Fredriksson et al. | 710/305 |
| 2007/0067518 | A1 | 3/2007 | Nichols | |

OTHER PUBLICATIONS

PCT International Search Report for PCT/IT2011/000019, dated Aug. 12, 2011.

* cited by examiner

Fig.1

|         | Column 00 | Column 01 | Column 10 | Column 11 |
|---------|-----------|-----------|-----------|-----------|
| Row 00  | Unit 0000 | Unit 0001 | Unit 0010 | Unit 0011 |
| Row 01  | Unit 0100 | Unit 0101 | Unit 0110 | Unit 0111 |
| Row 10  | Unit 1000 | Unit 1001 | Unit 1010 | Unit 1011 |
| Row 11  | Unit 1100 | Unit 1101 | Unit 1110 | Unit 1111 |

Fig. 7

The winner is E

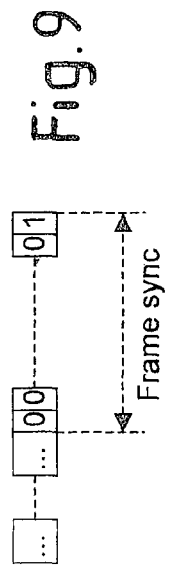

| Frame Sync | TG = 1 | NF = 1 | M = 0 | Serial Number |

Fig.15

| Frame Sync | TG = 1 | NF = 1 | M = 0 | Serial Number | Real command |

TSG

| Frame Sync | TG | NF | M | ER | SR |
|---|---|---|---|---|---|
| | 1 | 1 | 1 | 1 | 1 |

A | 0 |
B | 0 |
C | 0 |
D | 0 |

Result

| Frame Sync | TG | NF | M | ER | SR |
|---|---|---|---|---|---|
| | 1 | 1 | 1 | 1 | 0 |

TSG

| Frame Sync | TG | NF | M | ER | SR | R0 | R1 | R2 | R3 |
|---|---|---|---|---|---|---|---|---|---|
| | 1 | 1 | 1 | 1 | 1 | 1 | 1 | 1 | 1 |

Rack request

A: SR=0, R1=0
B: SR=0, R1=0
C: SR=0, R2=0
D: SR=0, R2=0

Result

| Frame Sync | TG | NF | M | ER | SR | R0 | R1 | R2 | R3 |
|---|---|---|---|---|---|---|---|---|---|
| | 1 | 1 | 1 | 1 | 0 | 1 | 0 | 0 | 1 |

Fig.18

| TSG | Rack request | | | | Rack selection |
|---|---|---|---|---|---|
| | R0 | R1 | R2 | R3 | Rack R1 |
| | 1 | 1 | 1 | 1 | 0 | 1 |

| A | H | H | | | H | | H | |
| B | H | H | | | H | | H | |
| C | | 0 | 0 | | | | | |
| D | | 0 | 0 | | | | | |

| Result | R0 | R1 | R2 | R3 | Rack R1 |
|---|---|---|---|---|---|
| | 1 | 0 | 0 | 1 | 0 | 1 |

Fig. 19

TSG

| Rack R1 | P0 | P1 | P2 | P3 | P4 | P5 | P6 | P7 |
|---|---|---|---|---|---|---|---|---|
| 0 | 1 | 1 | 1 | 1 | 1 | 1 | 1 | 1 |

Free/used position

Someone else

0

A: H H
B: H H
C: H H
D: H H

Result

| Rack R1 | P0 | P1 | P2 | P3 | P4 | P5 | P6 | P7 |
|---|---|---|---|---|---|---|---|---|
| 0 | 1 | 1 | 1 | 0 | 1 | 1 | 1 | 1 |

Fig. 20

| TSG | P7 | P0 | P1 | P2 | P3 | P4 | P5 | P6 | P7 |
|---|---|---|---|---|---|---|---|---|---|
|  | 1 | 1 | 1 | 1 | 1 | 1 | 1 | 1 | 1 |

Selection of a position

A
B  0
C
D        0

| Result | P7 | P0 | P1 | P2 | P3 | P4 | P5 | P6 | P7 |
|---|---|---|---|---|---|---|---|---|---|
|  | 1 | 1 | 0 | 1 | 1 | 1 | 0 | 1 | 1 |

Fig.21A

| TSG | P7 | SLOT | Slot selected | | | | | | |
|---|---|---|---|---|---|---|---|---|---|
| | 1 | 0 | 0 | 1 | 1 | 1 | 1 | 1 | 1 |
| A | 1 | H | H | 1 | 1or H | 0 | 0 | 1or H | 1or H |
| B | | H | H | | | | | | |
| C | | H | H | | | | | | |
| D | | H | H | | | | | | |
| Result | 1 | 0 | 0 | 1 | 0 | 0 | 0 | 0 | 1 |
| | P7 | SLOT | | SN "2" | | | SN "3" | | |

Fig.21B

| TSG | SN | | | | | | | |
|---|---|---|---|---|---|---|---|---|
| | 1 | 1 | 1 | 0 | 0 | 1 | 1 | 1 |
| A | 0 | 1or H | 0 | 0 | 0 | 1 | 1 | 1or H |
| B | | | | | | | | |
| C | | | | | | | | |
| D | | | | | | | | |
| Result | 0 | 1 | 0 | 0 | 0 | 1 | 0 | 1 |
| | SN "4" | | | | | SN "5" | | |

Fig.22A

| TSG | Rack selection | Free/used position | | | | | | | | | Selection of a position | | | | | | | |
|---|---|---|---|---|---|---|---|---|---|---|---|---|---|---|---|---|---|---|
| | Rack R2 | P0 | P1 | P2 | P3 | P4 | P5 | P6 | P7 | P0 | P1 | P2 | P3 | P4 | P5 | P6 | P7 |
| | 1 | 0 | 1 | 1 | 1 | 1 | 1 | 1 | 1 | 1 | 1 | 1 | 1 | 1 | 1 | 1 | 1 |
| A | H | H | | | | | | | | | | | | | | | | |
| B | H | H | | | | | | | | | | | | | | | | |
| C | H | H | | | | | | | | | | 0 | | | | | | |
| D | H | H | | | | | | | | | | 0 | | | | | | |

| Result | Rack R2 | P0 | P1 | P2 | P3 | P4 | P5 | P6 | P7 | P0 | P1 | P2 | P3 | P4 | P5 | P6 | P7 |
|---|---|---|---|---|---|---|---|---|---|---|---|---|---|---|---|---|---|
| | 1 | 0 | 1 | 1 | 1 | 1 | 1 | 1 | 1 | 1 | 1 | 0 | 1 | 1 | 1 | 1 | 1 |

| TSG | Frame Sync | TG | NF | M | ER | R0 | R1 | R2 | R3 |
|---|---|---|---|---|---|---|---|---|---|
| | | | | | | | Rack request | | |
| | | 1 | 1 | 1 | 1 | 1 | 1 | 1 | 1 |
| A | | | | | | | 0 | | |
| B | | | | | 0 | | 0 | | |
| C | | | | | 0 | | | 0 | |
| D | | | | | 0 | | | 0 | |

| Result | Frame Sync | TG | NF | M | ER | R0 | R1 | R2 | R3 |
|---|---|---|---|---|---|---|---|---|---|
| | | | | | | | Rack request | | |
| | | 1 | 1 | 1 | 0 | 1 | 0 | 0 | 1 |

Fig. 24A

| TSG | Slot selected | | | | | | | | Slot selected | | | | | | | |
|---|---|---|---|---|---|---|---|---|---|---|---|---|---|---|---|---|
| | SLOT | | | SN for slot 1 | | | | | SLOT | | | SN for slot 1 | | | | |
| | 0 | 0 | 1 | 1 | 1 | ... | 1 | 1 | 1 | 0 | 1 | 1 | 1 | 1 | ... | 1 | 1 |
| A | H | H | H | | | 2345 | | | | | | | | | | |
| B | H | H | H | | | | | | | | | | | 2355 | | | |
| C | H | H | H | | | | | | | | | | | | | | |
| D | H | H | H | | | | | | | | | | | | | | |

| Result | | | | | | | | |
|---|---|---|---|---|---|---|---|---|
| SLOT 1 | | | SN winner for slot 1 | | SLOT 5 | | | SN winner for slot 5 |
| 0 | 0 | 1 | 2345 | | 1 | 0 | 1 | 2355 |

Fig. 24B

| | Frame Sync | TG | NF | M | ER | SR | D | Shared data | | | | | |
|---|---|---|---|---|---|---|---|---|---|---|---|---|---|
| TSG | | 1 | 1 | 1 | 1 | 1 | 0 | 1 | 1 | 1 | 1 | 1 | 1 |
| A | | | | | | | | | | | | | |
| B | | | | | | | | 0 | 1 | 0 | 1 | | |
| C | | | | | | | | 0 | 1 | 1 | ☒ | | |
| D | | | | | | | | | | | | | |

| | Frame Sync | TG | NF | M | ER | SR | D | Shared data | | | | | |
|---|---|---|---|---|---|---|---|---|---|---|---|---|---|
| Result | | 1 | 1 | 1 | 1 | 1 | 0 | 1 | 1 | 0 | 1 | | |

| | Frame Sync | TG | NF | M | ER | SR | D | Shared data | | Rack selection | | | Position 1 | | ack |
|---|---|---|---|---|---|---|---|---|---|---|---|---|---|---|---|
| TSG | | 1 | 1 | 1 | 1 | 1 | 0 | | | Rack 1 | 0 | 1 | 0 | 0 | 1 | 1 |
| A | | | | | | | | | | | | | | | | | 0 |
| B | | | | | | | ... | | | | | | | | |
| C | | | | | | | ... | | | | | | | | |
| D | | | | | | | ... | | | | | | | | |

| | Frame Sync | TG | NF | M | ER | SR | D | Shared data | | Rack selection | | Position selection | | | ack |
|---|---|---|---|---|---|---|---|---|---|---|---|---|---|---|---|
| Result | | 1 | 1 | 1 | 1 | 1 | 0 | ... | | 0 | 1 | Rack selection | 0 | 0 | 1 | 0 |

Fig.27

METHOD AND TRANSMISSION PROTOCOL FOR TRANSMISSION OF DATA AMONG DEVICES SHARING A COMMUNICATION CHANNEL

TECHNICAL FIELD

The present invention relates in general to the transmission of information between devices that share a transmission channel (bus). Each device has its own identification number and it can transmit information to other devices connected to the same bus or communication channel.

STATE OF THE ART

There are many applications in which it is necessary to communicate information between electronic devices connected to a bus, for example to send commands and instructions from one device to another or to share information between these devices. For example, when multiple inverters are connected in parallel to supply power on an electric line, it is necessary to balance the various inverters to cause each of them to work substantially under the same conditions, substantially supplying the same current. For this purpose, it is necessary that each device knows at least the working conditions of the inverter that at each instant is supplying the greatest power and its own working conditions, to modify them. The shared communication line (bus) that connects the inverters enables to exchange the necessary information.

Typically, in any system in which a plurality of devices are cabled on a shared communication line (for example an RS485 line), the need arises to allocate an address to each device, in order to communicate with the other devices connected to the same line, so that the various messages are correctly addressed to the devices for which they are intended and in such a way that the address of the device that generated a message is known.

Typically, devices are mounted in a rack. Each position of the rack has a physical or hardware interface, for example an analogue communication line, which enables to allocate to each device a static address that corresponds to the physical position which the device has in the rack. Once it is inserted in the rack, the device retrieves its own address when it is turned on, reading the information about the static address on the hardware interface. FIG. 1 schematically shows a rack that substantially comprises a matrix of housings arranged in four rows numbered with binary notation 00, 01, 10, 11 and in four columns, also numbered with binary notation 00, 01, 10, 11. Each position is characterised by an address defined by four binary digits, two identifying the row and two identifying the column. The intersection between row and column defined by four binary digits forms the physical address of the device inserted in the corresponding housing.

This addressing method, widely used in the industry, has some advantages such as the fact that the address of a device corresponds to the physical position of the device in the rack, which enables, for example in case of a fault message containing the address of the device, to identify the device itself physically in an immediate manner, simplifying the maintenance operation. Moreover, operating the system is intuitive and easy to understand for anyone.

However, an approach of this type also has considerable drawbacks. If the static addressed is generated by an analogue line, each device has to dedicate an analogue input for reading the static address. This input constitutes a precious resource of the device, because normally a limited number of analogue inputs exists on each device and hence the use of one of them solely for reading the address limits the potential of the device. Moreover, the higher the number of devices connected to the analogue line, the more accurate the reading must be in order to avoid errors in the allocation of the static address. The length of the analogue line and the presence of noise can lead to errors in the reading of the address.

Vice versa, when the static address is allocated by means of a digital line, for example by dip-switch, address allocation may be erroneous because of a mistake by the operator in switching the dip-switches. Moreover, the number of digital inputs necessary to read the address may be high.

Additionally, regardless of the technology (digital or analogue) used to allocate the static addresses to the devices, it is necessary to dedicate a bus (in the rack or in the individual device) and connectors solely for the purpose of allocating the address, an operation that in theory is carried out only once. This entails a waste of resources.

When a device is moved from one housing to another in the rack and it remains lighted during the move, for example because of internal capacities, it retains the previous static address, which is wrong and it comes in conflict with the new device to be inserted in the housing from which it was removed. If no device is inserted in the previous housing, no conflict situation is created, but if the static address stored in the memory of device that was moved no longer matches its physical position in the rack and the operator may not realise that this anomalous situation exists.

In addition to the addressing problems described above, prior art solutions present additional drawbacks when the need to share information among the devices arises. One of the items of information that may need to be exchanged is the power supplied by each device, as mentioned above. In this case, the information is necessary to avoid an imbalance among the devices, which may lead to the detachment of one or more devices or to a condition in which the device that supplies less power is seen as a load by the remaining devices. Similar information exchange requirements exist, for example, when it is necessary to control cooling fans in a power supply station, based on the temperature measured by a plurality of sensors. Similar problems with sharing information about the temperature in various points of a complex system may occur in the case of battery charges that must be operated according to the measured temperature.

In prior art configurations, the communication bus is used to share information of this kind among the devices of the system; identified by their address. The problem to be confronted in this case stems from the long time required to collect all information that must be shared among the various devices connected to the communication line. Consider, for example, 64 devices connected to a bus, which are interrogated by a master to read a parameter, for example temperature, with an interrogation time of 100 ms, typical of an RS485 line. The total time required to collect the data from all devices is 6.4 seconds. Updating the operating conditions of the devices with this cadence leads to the risk that the devices work for long times on the basis of outdated data that do not match the actual conditions of the system. In general, if the data on which control of the devices is based change at a faster rate that the data collection rate, the system is not managed correctly. The higher the number of devices, the longer the time necessary to collect and share the data necessary to manage the individual devices and hence the more severe the problem described above.

SUMMARY OF THE INVENTION

The invention proposes a method for addressing and sharing information that fully or partly overcomes the problems of prior art methods and systems.

Essentially, the invention is based on the use of a communication channel, or communication bus, whereto a plurality of devices are connected in parallel. All devices transmit information on the communication channel at the same time; therefore, a system for managing conflicts among data is necessary. For this reason, each device is connected to the communication channel in order to transmit and receive data simultaneously. In this way each device, while it transmits its own data, is able to read the data instantaneously present on the communication channel. As will be clarified below, this enables to manage and resolve potential conflicts among devices that attempt to access and transmit simultaneously on the communication channel. Moreover, each device is provided with a unique identification number, for example a serial number assigned at the production stage or during a programming stage.

To manage the data and information traffic, each device is provided with a virtual address. While it is theoretically possible to use the unique identifier as a virtual address, according to advantageous embodiments this is not done. On the contrary, each device receives a unique virtual address, whose format is optimised to reduce data transmission times and costs.

Characteristically, according to the invention a data transmission is always present on the communication channel, even when no communication is required. This means that when the system is operating, even if at a certain instant no device requests to transmit data, a signal is present on the communication channel. This signal is constituted by an alternating sequence of voltage values, typically a sequence of two voltage values, hereafter referred to as "gnd" and "Vbus". Data transmission takes place through a plurality of symbols, each of which has a determined time duration (which may be varied modifying the transmission frequency). The duration of each symbol is defined as "period". Each symbol differs from the others and is characterized by a given sequence of voltage values. As will be clarified farther on, in some embodiments four symbols are sufficient, each defined by a symbol period, subdivided into four sub-periods. Each symbol is defined by the succession of the four sub-periods, in each of which the voltage takes one or the other of the two values "gnd" and "Vbus". A symbol is distinguishable from the other based on how voltage varies within the individual symbol period. The method is based on the use of at least one dominant symbol and of at least one recessive symbol. Each of these two symbols can be defined in any way. An example of definition of dominant and recessive symbol respectively will be provided below. When a recessive symbol is present on the transmission channel, if any one of the devices connected to the channel transmits a dominant symbol, the latter cancels the recessive symbol and hence all devices read a dominant symbol. Only if all the devices that transmit at a given instant transmit a recessive symbol on the channel, this symbol remains on the communication channel. The bus or communication channel must be such as to allow the presence alternatively of a dominant signal and of a recessive signal; the communication channel and the devices connected to it are configured in such a way that the dominant symbol overcomes the recessive symbol as stated above.

In the absence of data to communicate, a sequence of mutually identical symbols is present on the transmission channel, all defined by a period subdivided into a plurality (for example four) sub-periods, which are characterised by a particular profile of bus voltage. This sequence of symbols constitutes a carrier, characterised by a transmission frequency and substantially constituted by a time succession of symbols, all identical and recessive.

When a device has to communicate on the communication channel, it overwrites its own message, constituted by a sequence of symbols, on the symbols that constitute the carrier. Each dominant symbol written by the device overwrites the recessive symbol present on the communication channel in the matching time interval or time slot.

According to one embodiment, the invention provides a method for the transmission of data between devices connected to a communication channel through sequences containing a combination of at least two symbols, a dominant one and a recessive one, in which: one of these devices has the function of time slot generator and transmits on said communication channel with a transmission frequency a sequence of symbols, each defining a time slot of a sequence of time slots, this sequence of symbols comprising at least one series of recessive symbols; and in which when one of these devices has to transmit on said communication channel, it generates a sequence of symbols, synchronised with the sequence of time slots generated by said time slot generator device and comprising at least one dominant symbol.

Advantageously, in some embodiments the devices are connected to the communication channel with a transmission connection and a reception connection. The devices sample the voltage on the communication channel by means of the reception connection; and when a device requests to transmit on said communication channel (in synchronism with the time slots generated by the time slot generator device) a message comprising a recessive symbol in one of said time slots, the transmission is interrupted if in said time slot on the communication channel a dominant symbol is present.

In advantageous embodiments, to solve the conflict among multiple devices attempting to transmit on the communication channel, a race is carried out based on a criterion of maximum value or of minimum value among the sequences of symbols generated by said devices. Essentially, two devices come in conflict when they attempt to transmit on the communication channel using the same intervals or time slots. When this happens, the message (i.e. the data sequence) that is found to be dominant is "published", i.e. transmitted on the channel. The dominance criterion is linked to the criterion of selection of the dominant and recessive symbols. If, as in the example illustrated below, the dominant symbol is a "0" symbol, then the race between two conflicting devices simultaneously attempting to transmit a sequence of symbols is won by the device that attempts to transmit the sequence with the lower value, because the symbol "0" is dominant and the symbol "1" is recessive.

The opposite takes place in a system in which the symbol "1" is selected as dominant and the symbol "0" as recessive. In this case, in a situation of conflict between two devices attempting to transmit in the same time slots, the device that has to transmit the higher value prevails.

Once the transmission protocol and hence the criterion for the dominance of a symbol over the other one is fixed, in practice there may be situations in which it is necessary or convenient that among several data, the item with the highest value instead of the one with the lowest value is transmitted. This means that there may be situations in which the symbol that in fact is recessive must win. This is not possible and the problem is solved by employing the 1's complement of the data item to be transmitted. If, between the two data items, the higher one has to be transmitted (i.e. the higher value of the two has to prevail), then the 1's complement of each of the two data items is transmitted and the conflict is resolved in favour of the 1's complement with the lower value.

In advantageous embodiments, the synchronisation of the data among multiple devices is obtained by means of a sequence or synchronization frame generated by one of the devices connected to said communication channel. The synchronization frame is advantageously constituted by a determined sequence of symbols, known a priori, for example a sequence of dominant symbols, closed by a recessive symbol.

Each device can be provided with a PLL algorithm to lock the synchronization frame, in a way that is known in itself.

The synchronisation frame can be generated by any device connected to the communication channel. For example, the synchronisation frame can be transmitted by a device that requires access to the communication channel to transmit a data item, a command or an interrogation to another device. In some embodiments, the synchronisation frame can be generated by the time slot generator device. In general, since the transmission protocol can be configured to manage a series of different operations, it can be advantageously provided, depending on the type of functions to be carried out or of data to be communicated, for the synchronisation frame to be generated by the time slot generator, or by a device that requires access to the communication channel.

To allow the management of a plurality of functions or operations, in some advantageous embodiments the method according to the invention provides for the synchronisation frame to be followed by a sequence of bits forming a command mask. The command mask comprises a sequence of time slots, each containing at least one recessive symbol. Each time slot can correspond to a determined function that may be performed by the system. The selection of the function to be carried out is performed by one of the devices of the system by means of the transmission of a dominant symbol in the corresponding time slot. Essentially, a generic device requests access to the transmission channel inserting a dominant symbol into one of the time slots of the command mask, which corresponds to a given function, that will subsequently be carried out. The sequence of data transmitted after the time slot of the command mask in which the dominant symbol was written may have a configuration that depends on the type of function selected. In practice, both the length of the sequence of symbols that follows the command mask, and the meaning of these symbols and hence their disposition, vary according to the type of command or function selected through the choice of the time slot of the command mask in which the dominant symbol was written.

Additional details and a better comprehension of the invention can be obtained from the description that follows of an embodiment, provided purely by way of example and without limitation, of the method of the present invention.

BRIEF DESCRIPTION OF THE DRAWINGS

The invention shall be better understood by following the description and the accompanying drawings, in which:

FIG. 1 shows a known addressing scheme;

FIGS. 6 to 28 show illustrative charts and diagrams of the transmission protocol and of the manners of performing determined functions through said protocol.

DETAILED DESCRIPTION OF AN EMBODIMENT OF THE INVENTION

General Layout of the System and Definition of the Symbols

Figure 2:
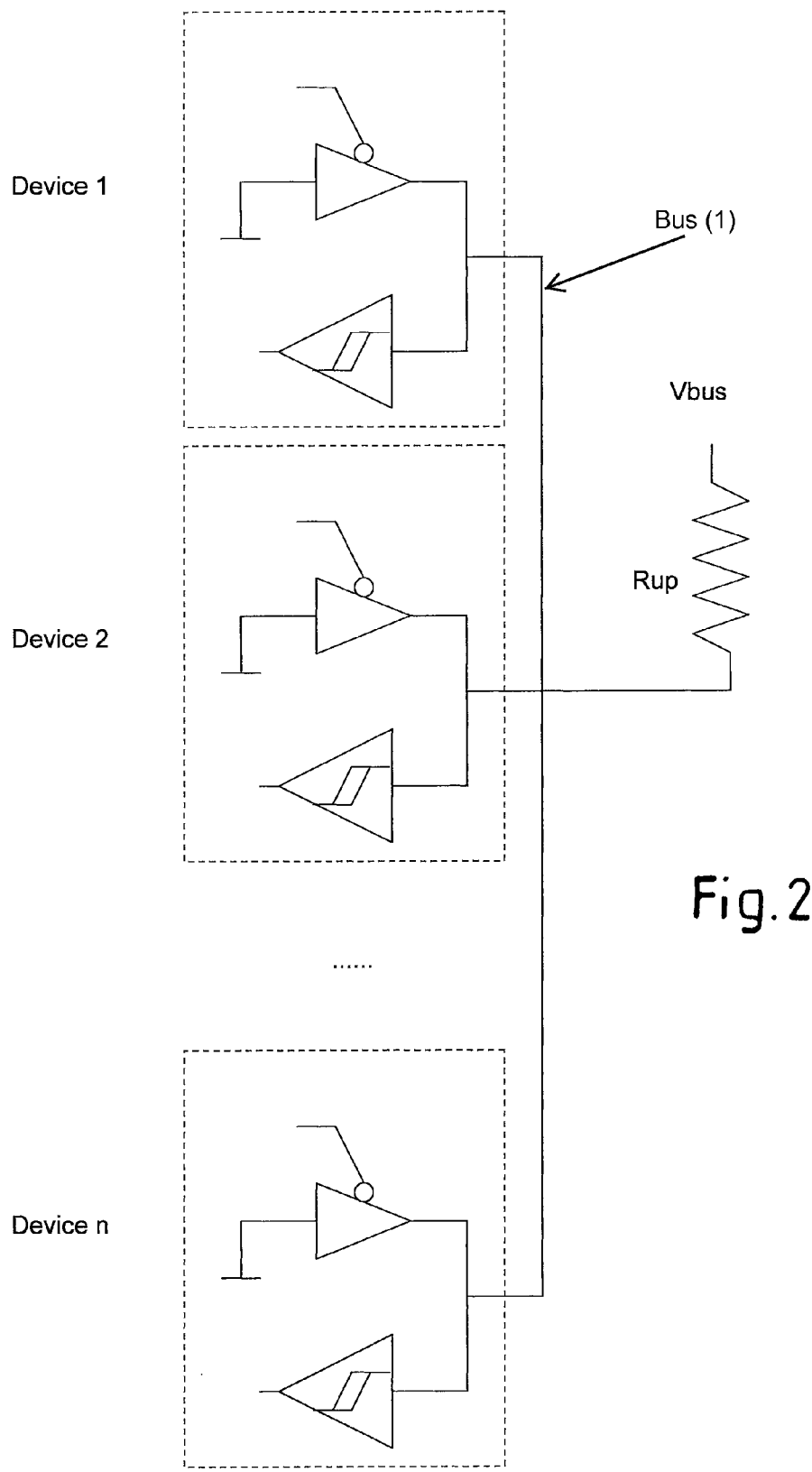
FIG. 2 shows a scheme for connecting a plurality of devices to a communication bus.

FIG. 2 shows a portion of a system in which n devices are present, indicated as $D_1, D_2, \ldots D_i, \ldots D_n$. Each device $D_i$ is a generic electronic device that has to share information through a bus 1 to which it is connected. In the illustrated example, the bus is a single ended bus, but it must be understood that what is described below can also be embodied with a different bus or communication channel, for example a differential bus, i.e. with two wires. The sole requirement the bus must satisfy is that two digital signals must be identifiable on the bus, one strong or dominant (S) and the other one weak or recessive (W). This means that when an attempt is made to transmit two different signals on the bus 1, the strong signal dominates over the weak signal and the strong signal will be present on the bus, whilst the weak signal will be inhibited. That is, the following conditions hold true:

$$W+W=W$$

$$W+S=S$$

$$S+S=S$$

In the description that follows, the dominant or strong signal is assumed to be a low voltage signal, or "0" signal, and the weak or recessive signal is assumed to be a high voltage, or "1" signal. The possibility of providing a system that operates in the reversed condition (1=strong signal; 0=weak signal) is not excluded.

Figure 3:
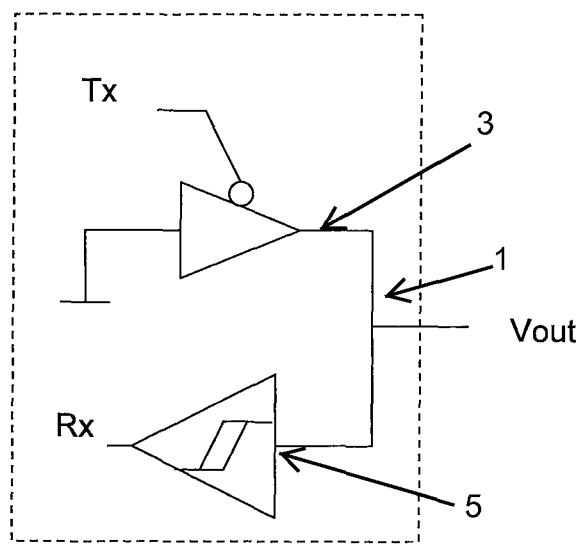
FIG. 3 shows a functional block diagram of the transmission and reception section of a single device.

In the scheme of FIG. 2, in the absence of communication on the bus 1 the voltage of the bus is kept high (Vbus) through a voltage source and a pull-up resistance Rup. FIG. 3 shows a functional block diagram of the transmission and reception section of an individual device $D_i$ connected to the bus 1. The reference number 3 indicates the connection for the transmission on the bus 1 and the reference number 5 indicates the reception connection. Vbus is the power supply voltage of the individual device $D_i$. As will become readily apparent farther on, each device must be able to receive the signals present on the bus whilst it is in the transmission phase. The truth table of the transmission section is as follows:

| TX | Vout | Rx |
|---|---|---|
| 0 | 0 | 0 |
| Vbus | high impedance | 0 | where Vout is the output voltage on the bus connection, as indicated in the chart of FIG. 3.

Having assumed the value "1" as weak or recessive value and the value "0" as strong or dominant value, if any device $D_i$ writes a "0" on the transmission section 3, the voltage of the bus is forced to "0". Vice versa, if the device attempts to transmit a signal at the "Vbus" level of voltage, if none of the other devices connected to the bus is transmitting (i.e. if all the other devices are silent), then the voltage of the bus remains unchanged. In fact, when the device $D_i$ is connected to the bus, the following situation occurs:

| TX | Vout | Rx |
|---|---|---|
| 0 | 0 | 0 |
| Vbus | Vbus | Vbus | because of the pull up resistance. When a plurality of devices $D_i$ are connected to the bus, the following conditions occur:

| $TX_{1...n}$ | Vout | Rx |
|---|---|---|
| at least one at 0 | 0 | 0 |
| all at Vbus | Vbus | Vbus |

Hence, the operating logic is as follows: if at least one of the devices $D_1, D_2, \ldots D_i, \ldots D_n$ connected to the bus 1 transmits a signal "0" (strong, i.e. dominant), the value of the voltage on the bus goes to "0" and on the reception section 5 (Rx) all devices read the signal "0". Only if all devices $D_1, D_2, \ldots D_i, \ldots D_n$ transmit a weak or recessive signal (Vbus) on the line or are silent, will voltage on the bus remain at the value Vbus.

Transmission of the messages on the communication channel or bus 1 takes place in synchronous mode at a frequency f. Messages consist of a sequence of symbols defined hereunder, generated by the combination of levels of high voltage (Vbus) and low voltage (gnd). The inverse of the frequency f is the period T (T=1/f) of an individual symbol used for the transmission of the information on the bus.

Figure 4:
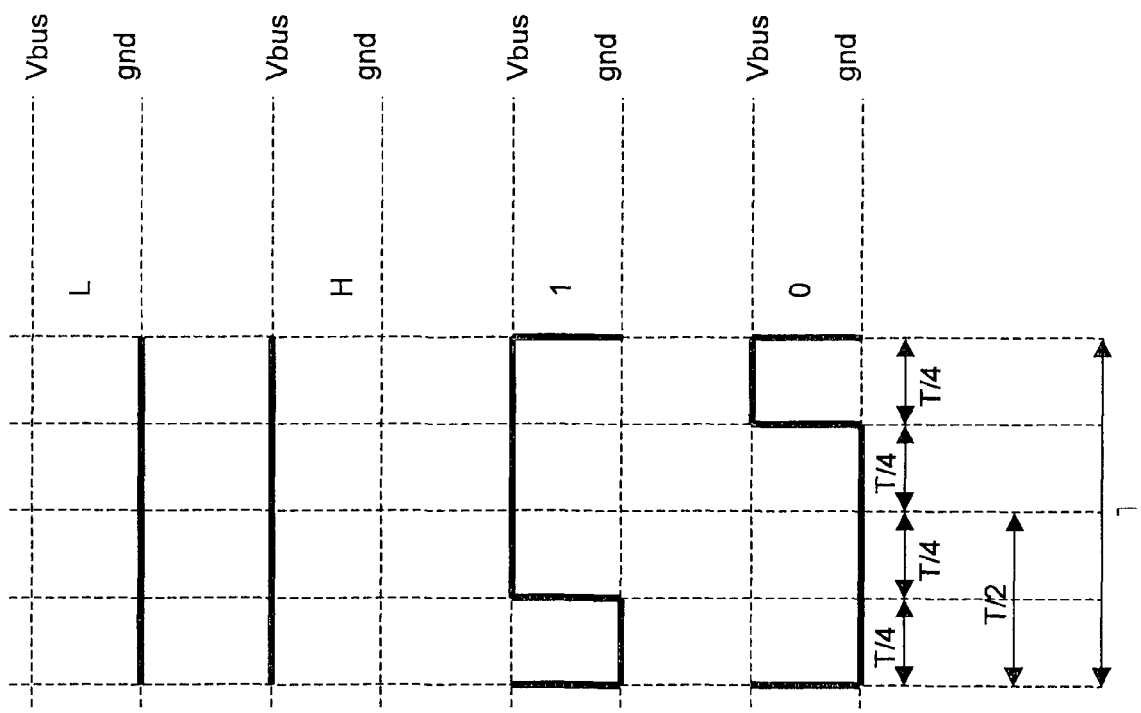
FIG. 4 shows a graphic representation of the symbols used in the transmission protocol according to the invention.

The period T is divided into four sub-periods with duration T/4 to define four symbols to be used for transmission on the bus. Each of the four symbols is defined by a sequence of voltage values, voltage being able to assume the two values, low ("gnd") or high ("Vbus"). FIG. 4 shows the four symbols indicated as L, H, 1 and 0, necessary and sufficient to manage the entire transmission protocol. "Vbus" is the pull-up voltage (high level) of the bus 1 and "gnd" is the low level of the voltage on the bus. As said previously, the high level is recessive or weak, whilst the low level is dominant or strong.

With reference to the chart of FIG. 4, the symbol "L" is defined by a period T during which the value of the voltage is low ("gnd") for all four fourths of a period. The symbol "H" is defined by a period during which the value of the voltage is high ("Vbus") for all four fourths of a period. The symbols "0" and "1" are defined in the following way:

the symbol "1" is defined by a period where in the first fourth of a period, with duration T/4, the value of the voltage is low ("gnd") and for the remaining three fourths of a period (of total duration 3/4T) the value of voltage is high ("Vbus") and equal to the pull-up voltage of the bus;

the symbol "0" is defined by a period where in the first three quarters of a period (duration 3/4T) the value of the voltage is low ("gnd") and for the last fourth of a period (duration T/4), the value of the voltage is high ("Vbus").

Both symbols "1" and "0", then, start with a fourth of a period with voltage "gnd".

This choice of the structure of the symbols "1" and "0" is dictated by the following consideration. As it is well known, the transition from the voltage Vbus to the voltage gnd is substantially immediate, whilst the reverse transition undergoes a delay because of the time constants deriving from the presence of capacitive components. Each symbol, then, starts with a period of voltage "gnd", because the transition of the bus voltage to this value is shorter or substantially immediate.

According to a preferred embodiment of the invention, for each period, in the first fourth a transition to the dominant signal is present. The recessive-dominant transition is substantially faster, if not immediate, relative to the reverse, dominant-recessive transition.

Since it has established that the value "gnd" is dominant or strong and the value "Vbus" is recessive or weak, for the symbols defined above the following truth table applies:

| A | B | Bus |
|---|---|---|
| L | x | L |
| H | x | x |
| 0 | 0 | 0 |
| 0 | 1 | 0 |
| 1 | 0 | 0 |
| 1 | 1 | 1 | where "x" indicates any symbol.

Figure 5:
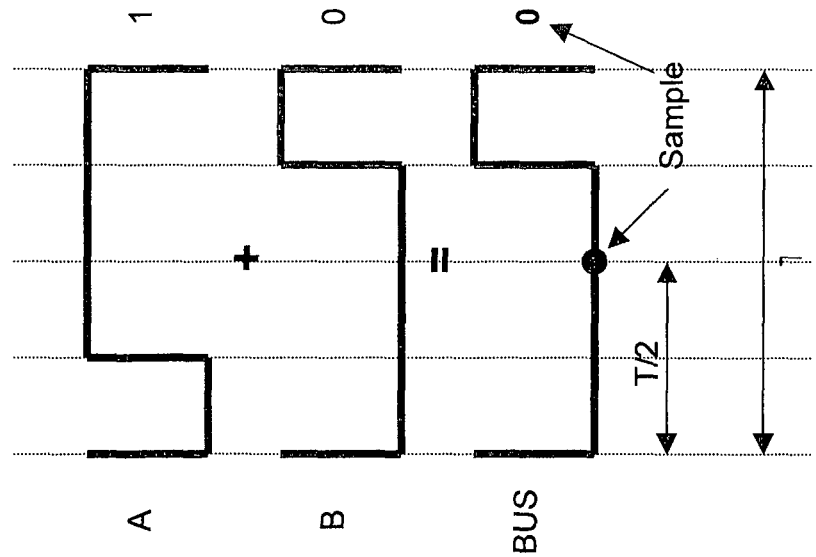
FIG. 5 shows the combination of the two symbols of the transmission protocol.

To understand the reason for this table, it is sufficient to consider that the value of voltage Vbus is recessive and the value "gnd" is dominant and that, to compare two symbols, each device samples the signal at half the period T. In FIG. 5, what takes place is indicated schematically: the device A transmits a symbol 1, in which the voltage at half period is equal to Vbus. The device B transmits a symbol 0 and samples the symbol transmitted by A at half period. Since the low value of voltage is dominant and the high value Vbus is recessive, the result of the conflict between the two symbols is the symbol 0.

The above truth table indicates the signal on the bus when two generic devices A, B transmit respective symbols in synchrony. From the first row of the table, one can infer that if a device transmits a symbol "L", whatever symbol is generated by the other device, a symbol "L" will exist on the bus, and hence a value of voltage "gnd". This is because the symbol "L" corresponds to a constant low value ("gnd") of voltage, which is dominant with respect to the high value (Vbus). If one of the devices generates a symbol "H", the signal generated by the other one of the two devices, whichever one it is, is present on the bus in any case. This is because the symbol "H" is at the value "Vbus" and hence it is recessive. If at least one of the two devices generates a symbol "0" and the other one a symbol "1", a symbol "0" (dominant) will be present on the bus, whilst only if both devices generate a symbol "1" will the symbol "1" be present on the bus.

The four symbols defined above (L, H, 1, 0) and the criterion defined by the truth table associated to these symbols enable to define the entire transmission protocol of the present invention. As it will be more apparent below, on the transmission channel or bus 1 there is a continuous transmission of mutually synchronised data. The conflict between data originating from different devices is resolved on the basis of a race between devices, where the winner is the device that transmitted in a certain transmission time interval the sequence of symbols "1" or "0" with the lower value (a mirror-image method could be based on a reversed criterion: the conflict between devices is won by the device that transmits the higher value).

Determination of Maximum or Minimum Values and Resolution of Conflicts Between Devices Before examining the details of the transmission protocol, on the basis of the description provided thus far, the manner of resolution of a conflict or confrontation among multiple devices, based on the criterion of maximum value (or of minimum value) of a data transmitted by the devices, is illustrated below. What is described with respect to the determination of the highest or lowest value will be useful for the comprehension of the more general criterion on which the information transmission protocol according to the present invention is based.

A practical case in which it may be necessary to determine the highest value in a series of values shared by multiple devices connected to the bus occurs for example in a plant in which multiple electronic devices need to be kept at a temperature below a threshold, beyond which malfunctions may occur. Cooling fans placed in determined positions in the plant are actuated by electric motors controlled electronically in such a way as to supply a sufficient flow of air to prevent temperature within the plant from exceeding a limit value. Temperature is measured by a series of temperature sensors and it may change according to environmental conditions and/or to the operating conditions of the various devices of the plant. Fan speed is controlled by the measured temperature values. Since there is a maximum temperature level that must not be exceeded, the fans must be controlled as a function of the highest one among the values measured by the plurality of sensors present in the system. In other words, the highest value among the temperature values measured by the sensors must dominate over the others and condition the operation of the fans.

A communication bus connects the sensors and the microcontrollers of the motors actuating the fans and it must enable to share the information necessary for correct cooling, causing each microcontroller of the fans to know the highest among the various temperature values measured by the different sensors. The system must know the maximum value of the measured voltage, because this determines whether or not it is necessary to increase cooling efficiency. Which sensor actually measured the highest temperature, i.e. where the greatest heat dissipation is located, is irrelevant for the purposes of the correct management of the cooling and therefore it is not necessary to identify which sensor measured the highest temperature value, but rather it is important just to know the highest value.

It is now assumed that four temperature sensors in four devices A, B, C and D measure four different temperature values, for example (the numeric value provided, purely by way of indication, is in an arbitrary scale):

A=5 (0101)
B=14 (1110)
C=12 (1100)
D=10 (1010)

where the values are indicated in the decimal system and, in parentheses, in the binary system. Since the system for the transmission of data on the bus, outlined above, is based on the criterion of dominance of the lowest among the values "0" and "1", to cause the highest of the four measured values to be transmitted on the bus, it is necessary to obtain the 1's complement of each temperature value expressed in the binary system. Consequently, the four devices A, B, C and D will have to transmit the following data:

A=1010
B=0001
C=0011
D=0101 using the symbols defined above with reference to FIG. 5.

Each temperature sensor is a part of an electronic device connected to the transmission bus with a transmission port 3 and a reception port 5 (FIG. 3). Each sensor will attempt to transmit on the bus 1 the 1's complement of the temperature value read by it using the symbols "1" and "0" (FIG. 5). Data transmission takes place synchronously among the various devices, so that all the devices will sent simultaneously on the bus in sequence the symbols "1" or "0" to write the 1's complement of the measured temperature value. In order for only the highest value to be transmitted, ultimately, on the bus 1, it is sufficient to operate as follows: each device attempts to transmit on the bus 1 in sequence the digits of the calculated value (i.e. the 1's complement of the measured temperature) starting from the most significant bit and at the same time it receives the value present on the bus, sampling the voltage on the bus. Since the devices A, B, C, D are mutually synchronised, each device will attempt to transmit on the bus 1 in sequence the four symbols forming the 1's complement of the temperature using a sequence of four time slots. During each time slot, each device also detects the signal present on the bus 1.

Figure 6:
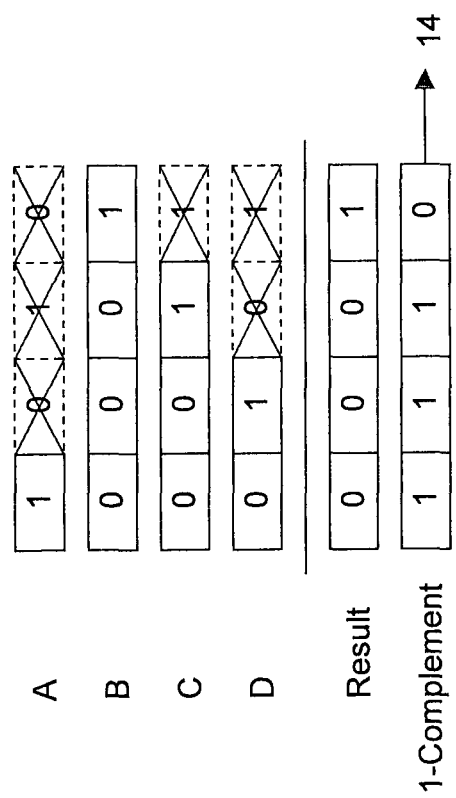

Each device stops transmitting its own value if and when in a given time slot the symbol that is being transmitted is recessive ("1") whilst a dominant symbol ("0") is present on the bus, in the same time slot. FIG. 6 schematically represents this operation and its result. The representation, which will also be used hereunder to illustrate other functions of the transmission protocol of the present invention, uses the following criterion: on each of the first rows (in the example, four rows corresponding to the four devices considered, indicated as A, B, C, D) the sequence of symbols that each respective device has to transmit on the bus is shown. The first row, for example, indicates that the device A has to transmit the sequence of symbols 1010, the second row indicates that the device B has to transmit the sequence of symbols 0001, etc. The fifth row represents the result, i.e. the sequence of symbols actually present or transmitted on the bus based on the criterion defined above (dominance of the symbol "0" with respect to the recessive symbol "1").

More in detail, the method is the following: the device connected to the sensor A starts transmitting the symbol "1" during the first time slot and it simultaneously reads on the bus the symbol "0", since at least one of the other devices (in this case, all other devices) is transmitting the symbol "0" on the bus 1. Since this value is dominant, the symbol "0" is present on the bus 1 in the first slot. Since the symbol "0" is dominant, the device A recognises that it has in its transmission buffer a different (recessive) value from the one on the bus 1 and therefore it ceases to transmit. The four successive symbols (010) on the string relating to the device A are barred, which indicates that the device A ceases to transmit.

The device D, vice versa, continues to transmit, because the first symbol of the number it must transmit (i.e. 0101) is dominant (symbol "0"). In the second period or time slot, the device D attempts to transmit the symbol "1", i.e. the second digit of the number 0101. The bus in the second period is at "0" because at least one of the other devices still transmitting (actually, both the devices B and C) are transmitting the dominant symbol "0". Consequently, the device D ceases to transmit its own data item. In the third period or time slot, the device C attempts to transmit a "1" and ceases to transmit, because on the bus is still present the symbol "0" transmitted by the device B. Consequently, the sole data item that is actually transmitted or written on the bus is the value "0001" generated by the device B. This value is the 1's complement of the value "1110", which is the maximum temperature value read by the various devices, i.e. 14. The result of this operation is that all devices connected to the bus (and hence also the devices controlling the cooling fans) know only the value corresponding to the maximum measured temperature. This value controls the management of the fans.

Briefly, this criterion for calculating the maximum value (or the minimum value) is based on the following rules:

a. if a device reads on the bus 1 a different value from the one that is being transmitted, it ceases to communicate on the bus;
b. if the minimum value has to be determined among the values present in a series of devices, each device will transmit its own value;
c. if the maximum value has to be determined among the values present in a series of devices, each device will transmit the 1's complement of its own value. The result on the bus will in turn have to be complemented to obtain the desired value.

Essentially: the criterion described enables to select the minimum (or the maximum, using the 1's complement) of multiple values which multiple devices attempt to transmit on the bus simultaneously.

From another viewpoint, the criterion described enables to resolve a conflict among multiple devices.

Conflicts among multiple devices $D_i$ are resolved adopting the criterion described above, applying it to a unique number assigned to each device connected to the bus.

For the system to be able to function correctly, each device $D_1, D_2, \ldots D_n$ must be uniquely identifiable. For this purpose, each device is provided with a unique identification number. Advantageously, this unique identification number can be a unique serial number $SN_i$ assigned to each device $D_i$ for example at the time of its manufacture or programming. In some embodiments, the unique serial number can be stored in a ROM or FLASH memory of the device. The conflict among multiple devices that have to transmit on the bus 1 is resolved with a criterion identical to the one described above for the calculation of the maximum (or of the minimum) value among multiple values coming from a group of devices.

Figure 7:
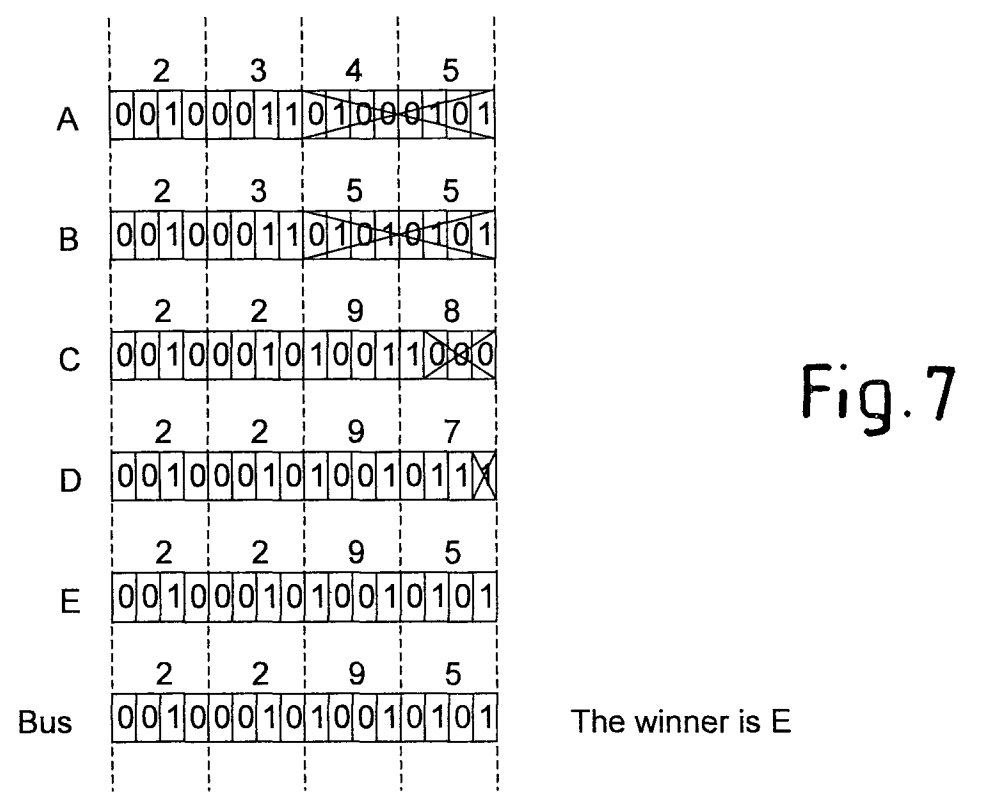

The manner of resolving a conflict among devices on the basis of the unique identifying number (serial number SN) is described hereunder with specific reference to the diagram of FIG. 7. In the diagram, the assumption is that a serial number SN comprising four decimal digits is used, and it is represented in binary notation with sixteen bits. In the illustrated example, the serial numbers of five devices, indicated as A, B, C, D, E, are the following (both in decimal and binary notation):

| Device | Serial number (decimal) | Serial number (binary) |
| --- | --- | --- |
| A | 2345 | 0010 0011 0100 0101 |
| B | 2355 | 0001 0011 0101 0101 |
| C | 2298 | 0010 0010 1001 1000 |
| D | 2297 | 0010 0010 1001 0111 |
| E | 2295 | 0010 0010 1001 0101 |

The lowest serial number is that of the device E. The selection takes place with a race similar to the one described with reference to FIG. 6, where the data that are transmitted in synchronism on the bus 1 are the binary digits representing the serial number SN of each of the five devices. Each device starts to transmit the data starting from the highest bit and ceases to transmit its own serial number on the bus when on the bus 1, in a given time slot of the transmission time scan with which all devices are synchronised, a bit appears which is different from the one that the device is transmitting.

Since all serial numbers start with the digit 2 (0010), the first digit of the serial number SN is transmitted by all devices in the first sequence of four periods or time slots of the time scan. In the next sequence of four slots or time periods, the devices whose second digit of the serial number is 3 (0011) cease to transmit, because in the eighth time slot (starting from the beginning of the transmission), on the bus 1 is present the dominant symbol "0" transmitted by the devices C, D and E, which is different from the recessive symbol "1" transmitted by the devices A and B. The process is repeated for the subsequent digits until the selection of the device E, which is the one with the lowest serial number SN. On the bus is then transmitted the sequence of digits representative of the serial number 2295. In other words: the conflict among the five devices is won by the device $D_i$ with the lowest serial number. The criterion can be based on the highest serial number $SN_i$, in which case the race among devices is carried out transmitting the 1's complement of the serial number SN of each device.

With this foreword, the general characteristics of the transmission protocol of the present invention can be described as follows.

Generation of the Time Slots—Time Slot Generator Device

A significant aspect of the transmission protocol is the fact that during operation, i.e. after the system is started with a procedure that will be described in greater detail below, on the transmission channel or bus 1 is always present a transmission signal cadenced with a frequency f and a corresponding transmission period T (f=1/T). The frequency may be changed for the reasons and in the ways described later on.

At each instant, in a system comprising the bus 1 and a plurality of devices $D_1, D_2, \ldots D_n$ there will be a single device that serves as generator of the transmission time slots, i.e. that provides the cadence for the transmission of the data on the bus 1. This device shall hereafter be called time slot generator device ($D_{TSG}$). It constitutes a sort of "metronome" whose function is to cadence data transmission. It transmits at the frequency f a sequence of symbols "1" (FIG. 4), each of which is constituted by a fourth of a period in which voltage is "gnd" (dominant) and three fourths of a period during which voltage is at the high value "Vbus" (recessive). In some situations, the time slot generator device $D_{TSG}$ generates a sequence of symbols "1" preceded by a synchronisation sequence. If none of the other devices has to transmit, on the bus 1 a repetitive transmission signal will be present, constituted by a series of frames or data packets, each of which presents a synchronisation portion and a subsequent portion that, in the absence of transmission by other devices connected to the bus, will be constituted by a succession of symbols "1" (defined as in FIG. 4), generated by the time slot generator device $D_{TSG}$, or simply a sequence of symbols "1".

In this way, on the transmission channel 1 is constantly present an information item transmitted by the $D_{TSG}$ even if no device requests to transmit information. One aspect of the present invention is that the transmission channel is occupied by a signal (sequence of symbols) even when no device has to transmit information. The sequence of symbols is the one generated by the device $D_{TSG}$.

When this cadenced signal is present on the bus, each device knows (sampling the signal on the bus) that to the bus is connected a device $D_{TSG}$ and it is able to identify that the signal present is a sequence of "1" at the frequency f. In fact, each device samples the signal present on the communication bus 1 at a higher frequency than the transmission frequency f. Therefore, it is able to verify that the voltage on the communication bus 1 varies periodically between the value "gnd" and the value "Vbus". This sequence of symbols provides the time cadence to regulate the transmission of messages by the $D_{TSG}$ or by any other device. Any message has to be synchronised on the sequence of symbols "1" generated by the $D_{TSG}$.

Structure of the Message

Any generic device $D_i$ can transmit a message on the transmission channel 1 synchronised with the sequence of symbols generated by the $D_{TSG}$. When no device has to communicate on the channel, the device $D_{TSG}$ transmits a sequence of structured messages as described hereafter with reference to FIGS. 8, 8A and 9. When a generic device $D_i$ (which can also be the device $D_{TSG}$ itself) has to transmit some type of information on the channel, it generates a message or frame that generally also has a structure of the type described below with reference to FIGS. 8, 8A and 9.

The presence of a device $D_{TSG}$ that transmits a sequence of messages or frame in the absence of other transmissions on the communication channel causes a sequence of symbol to be always present on the channel. When a generic device $D_i$ has to transmit a message, it will do so in synchrony with the sequence of frames or messages transmitted by the device $D_{TSG}$. The logic described above with reference to the truth table for the symbols "1", "0", "L" and "H" causes the message transmitted by a device that requests the availability of the transmission channel to predominate on the message transmitted by the device $D_{TSG}$.

The generic message comprises an initial synchronisation portion indicated as "frame sync". This portion of the message is constituted by a very precise sequence of binary digits and it indicates the start of a new frame or message to all devices listening on the transmission channel 1. The various devices connected to the transmission channel 1 can synchronise with this initial portion of the message In any manner known in the art.

In one embodiment, the "frame sync" comprises a sequence containing a given number $N_{stop}$ of symbols "0", where $N_{stop}$ can be chosen at will and set for a given system. The sequence of symbols "0" is followed by a symbol "1", as schematically indicated in FIG. 9. The actual data transmission starts, in each data frame, after the symbol "1" that follows the preceding $N_{stop}$ symbols "0". The symbol "1" transmitted after the sequence of $N_{stop}$ symbols "0" indicates to all devices connected and receiving on the transmission channel 1 that the transmission of a series of data by one of the devices connected to the channel is about to start.

As shown in FIG. 8, a data frame comprises (in addition to the initial portion of "frame sync" structured as shown in FIG. 9), a portion indicated as "command mask" and a portion or section indicated as "parameters". The command mask comprises a sequence of bits that indicates the communication mode for that given frame or message. FIG. 10 shows an example of configuration of the command mask. In this example, the command mask comprises six fields, distinguished with the references TG, NG, M, ER, SR and D, each containing one bit. The fields are sorted according to a priority criterion. If the bit contained in a field is equal to "1", it is simply ignored. The first bit in the sequence that contains a dominant symbol "0" indicates that the message contains a command related to the execution of a given operation.

In general, what happens is the following. In the absence of communication, the device $D_{TSG}$ generates and transmits on the communication bus 1 a sequence of symbols with a determined transmission frequency, established with a criterion that will be described below. In some embodiments, the sequence of symbols is simply a sequence of symbols "1" (FIG. 4). In other embodiments, the sequence of symbols generated by the time slot generator device $D_{TSG}$ can comprise a sequence of "frame sync" followed by a command mask (FIGS. 8, 8A, 9, 10) containing symbols "1". In general, the time slot generator device $D_{TSG}$ can generate, depending on the case, a simple sequence of symbols "1", or a succession of synchronisation frames "frame sync" followed by a command mask.

As will be explained below, in some circumstances (which may or may not occur, depending on how the transmission protocol is structured), it is necessary for the $D_{TSG}$ to generate the synchronisation frame followed by the command mask, whilst in other situations it is necessary for the synchronisation frame "frame sync" to be generated by another device, different from the time slot generator device $D_{TSG}$.

In general, when any device (for example the $D_{TSG}$ itself, a generic device D, of the system or a master) has to engage the channel or communication bus 1 to transmit data or execute commands, it will use one of the fields of the command mask writing in that field (i.e. transmitting in the corresponding time instant on the bus) a dominant symbol "0", followed by a sequence of bits whose structure and whose meaning is determined by the position in which the device itself has written (inside the command mask of the current message or frame) its dominant symbol "0". In general, the synchronisation frame and the command mask that follows said frame can be generated by the time slot generator device $D_{TSG}$, or by the device that requests access to the synchronisation channel. In some cases, described below, it is necessary for the device that engages the channel for the transmission to write the synchronisation frame.

Hereafter is described a series of possible operations that can be managed with this logic. It must be understood that the transmission protocol can actually provide for many more functions or operations and hence a longer command mask, where each bit defines a determined command or operation.

When no device has to communicate and hence no operation has to be carried out on the communication channel, in the absence of other data, a "carrier" will be present, constituted by a sequence of symbols "1" or a succession of symbols constituted by a sequence of synchronisation frames ("frame sync") each followed by the command mask, as shown schematically in FIGS. 8 and 8A, where the sections constituted by the command mask and by the parameters are formed by a predetermined series of recessive symbols (symbol "1" in this example), whilst the section called "frame sync" contains a predetermined sequence of symbols "0" that ends with a symbol "1" (FIG. 9). In some cases, "bit stuffing" techniques can be adopted to avoid the need to expand excessively the sequence of symbols forming the "frame sync".

In practice, in a situation like this, where the symbols of the command mask are all recessive symbols "1", the parameter section may be omitted. It will be generated only when a device (or multiple devices in mutual conflict) will have to transmit data or commands, which will have a determined structure, depending on the type of data or command, and will be defined by a sequence of symbols of variable length contained in the "parameter" portion of the message transmitted on the communication bus 1.

When a generic device $D_i$ has to transmit information or a command on the communication bus (the device $D_i$ could be the device $D_{TSG}$ itself), it writes on the channel a message having the structure of FIG. 8, 9, in which in at least one of the bits forming the command mask, which follows the "frame sync", contains a dominant symbol "0". Alternatively, if the device $D_{TSG}$ is transmitting a sequence constituted by synchronisation frames ("frame sync"), each followed by a command mask containing all symbols "1", then the device that requests access to the channel can simply write the symbol "0" in the correct slot (i.e. the one corresponding to the function that the device wants to activate or carry out) of the command mask.

The data contained in the portion of the parameters will have a format and a meaning that are a function of the position of the dominant symbol "0" in the command mask.

In the illustrated example, the six fields of the command mask refer to the following operations:

- TG (Time slot Generator): if this field contains the symbol "0", the device that generated it requests the start of a procedure to identify a time slot generator device. This can occur, for example, when a time slot generator device has not yet been selected, or when for any reason the selection of a different time slot generator device is requested;
- NF (New Frequency): if the TG field contains the symbol "1" and the successive field NF contains the symbol "0", the device that generated the message requests the definition of a new transmission frequency. This may serve, for example, to increase the data transmission frequency with respect to the frequency currently in use when said message is generated, in order to optimise the operating speed of the system. Since the bits that define the command mask are sorted according to a decreasing priority from the bit TG to the bit D, the selection of a new operating frequency is a function whose priority is lower than the selection of the time slot generator device. This corresponds to the fact that the most important function that must be carried out in the system for the transmission to take place correctly is the selection of a time slot generator device. The entire transmission protocol, in fact, is based on the idea that the transmission channel 1 is always occupied by information that, in the absence of transmissions by the devices, will be represented by the sequence of recessive symbols "1" generated by the device $D_{TSG}$;
- M (Master): if the preceding fields contain the symbol "1" and this field contains the symbol "0", the device that generated the message is a controller or a master that requests the availability of the channel to send instructions or commands or to ask for information from the remaining connected devices;
- ER (Extended Race): if the preceding fields contain the symbol "1" and the ER field contains the symbol "0", the device that generated the message requests an extended procedure for the assignment of a virtual address. This procedure will be described below;
- SR (Simplified Race): if the preceding fields contain the recessive symbol "1" and the SR field contains the dominant symbol "0", the device that generated the message requests a simplified procedure for the assignment of a virtual address. This procedure will be described below;
- D (Data): if the preceding fields contain the symbol "1" and the field D contains the symbol "0", the device is about to transmit a series of data. The data are contained in the subsequent section of the frame or message, i.e. in the section indicated as "parameters" in the diagram of FIG. 8.

The meaning and the modes of execution of each of the procedures to which the fields TG, NG, M, ER, ES and D correspond are described in detail below. The procedures briefly described above are merely indications. The protocol can be implemented with a higher or lower number of procedures than those listed herein. An example of an additional procedure that can be incorporated in a modified embodiment of the protocol according to the invention will be described later on.

If all symbols of the command mask and of the parameters portion are equal to "1", then the frame is meaningless and it will not be considered.

In some embodiments, one or more of these fields may not be used if they are not deemed necessary for the specific application.

If one of the symbols in the fields TG, NF, M, ER, ES and D is equal to "0" (dominant symbol), the subsequent fields of the message, up to the point where the message ends, have a meaning that can vary according to the position taken by the first dominant symbol "0" in the command mask. In other words: when, for example, the recessive symbol "1" is present in the TG field, whilst the dominant symbol "0" is present in the NF field, the subsequent fields are no longer necessarily a part of the command mask, but rather are used for the function triggered by the dominant symbol "0" in the NF field. All this will be clarified below with reference to examples of implementation of the functions related to the fields of the command mask.

Selection of the Time Slot Generator Device

When the system is started, there is no signal on the bus 1 and no device has been selected as time slot generator device $D_{TSG}$. In these conditions, the voltage on the bus 1 detected by each device is Vbus. This corresponds to the presence of the symbol "H" on the communication bus (FIG. 4).

Each device $D_1, D_2, \ldots D_n$ is programmed to wait a minimum time interval $T_{no-com}$ after it is powered, during which it does not transmit.

Let it now be supposed that any of the devices gets powered up. It will wait a time $T_{no-com}$ during which it does not transmit any data on the bus, but it samples the bus voltage with a sampling rate high enough to recognize a signal variation and a possible start of the generation of a synchronism signal. In some embodiments, the sampling rate can be four times the data transmission rate (after the presence of the carrier is recognised). In this way, in a period T equal to the length of a symbol "0" or "1", sampling is carried out in each of the four fourths of a period, preferably approximately at the centre of each of them. In this case, the sampling carried out in the second fourth of a period is used to discern between a symbol "1" (sampled voltage equal to Vbus) and a symbol "0" (sampled voltage equal to "gnd").

If, during this time interval, the voltage sampled by the device on the bus 1 is always equal to Vbus, this is interpreted to mean that there is no ongoing communication. After each device has waited the same time $T_{no-com}$, for all devices, each device waits an additional time interval equal to k*ΔT, where k is a random number generated by the device (each $i^{th}$ device generates a random number $k_i$) and ΔT is an appropriately chosen time interval. Indicating with $f_{symbol}$ a minimum transmission frequency (corresponding to a time slot T of maximum duration), compatible with the operating frequency of any device in the system, the time interval ΔT will be equal to at least $3/(4f_{symbol})$ and preferably $1/f_{symbol}$.

If, during this additional time interval k*ΔT, a given device detects an information traffic on the transmission channel 1, this device will not assign itself the $D_{TSG}$ function, because it means that a different device has already assumed this function. It has been seen that in the absence of communication on the bus 1, the time slot generator device $D_{TSG}$ (if present) transmits on the channel a sequence of symbols that has the function to give a transmission cadence. The sequence of symbols is the one defined by the portions Frame Sync and Command Mask (in the case of a message start) in FIGS. 8, 8A, 9 or simply a sequence of symbols "1" (in case of absence of message to give the background tone which the other devices can engage to communicate) (FIG. 4).

Once the maximum time interval defined by the maximum value k generated by the various devices elapses, at least one, or more in general a group of devices will not have detected information traffic on the channel. These devices (i.e. those that up to this instant have not identified traffic on the bus) will start to transmit a frame or message having the structure of FIG. 8, that starts with a synchronisation sequence "frame sync", followed by a command mask in which the slot TG contains the symbol "0". The transmission takes place at a minimum frequency $f_{symbol}$ set a priori and such as to be acceptable for any device connected to the system. To reduce the number of devices that start to transmit, an additional protocol rule is determined:

each device that reads a value "gnd" on the transmission channel does not transmit.

Since, as seen with reference to the definition of the symbols in FIG. 4, each symbol "0" and "1" starts with a fourth of a period at "gnd" level, if at a given instance a device attempts to access the transmission channel 1 to transmit a frame and reads a value "gnd" on the channel, it will cease to transmit. In fact, if the voltage level on the channel is low, there is traffic on the channel and hence a time slot generator device has already been selected. In this regard, it must be kept in mind that each device samples the signal of the communication bus 1 at a frequency appropriately higher than the symbol transmission frequency. For example, as indicated above, the sampling frequency can be four times the transmission frequency, with a sampling for each fourth of a period. In this case, the sample used to recognise whether the symbol read is a "1" or a "0" will be the second sample of the period, taken within the second fourth of the period T. The sampling carried out in the first fourth of the period enables the generic device $D_i$ connected to the communication bus 1 to verify whether in a given time slot on the communication bus is present the voltage value "gnd" during the first fourth of a period of a generic symbol contained in a generic time slot.

Neglecting the finite time of the voltage drop front, which elapses from the instant in which a device starts the transmission of a value "gnd" to the instant in which voltage on the bus is actually equal to "gnd", it can be assumed that at the end of this procedure on the bus will be present more than one device which, based on the above observations, behaves as a time slot generator device $D_{TSG}$. Since the system requires a single $D_{TSG}$, a procedure is now carried out for the selection of a single device among those that until this time has deemed to be the time slot generator device.

This procedure can advantageously be a race among the operating devices that have assigned themselves the function of time slot generator device. The race is carried out on the basis of the identifying numbers or serial numbers SN (which is a unique identifying number) of each device in question or a possible other unique identifier given during production. The race is carried out in such a way as to make the one with the highest serial number win (hence being selected as the time slot generator device). In other embodiments, the criterion can be to select the device with the lowest serial number.

The procedure to select, among any number of devices, the one with the lowest serial number has already been described with reference to FIG. 7. To select the one with the highest serial number, it will be sufficient to use the 1's complement of each serial number SN.

Figure 11:
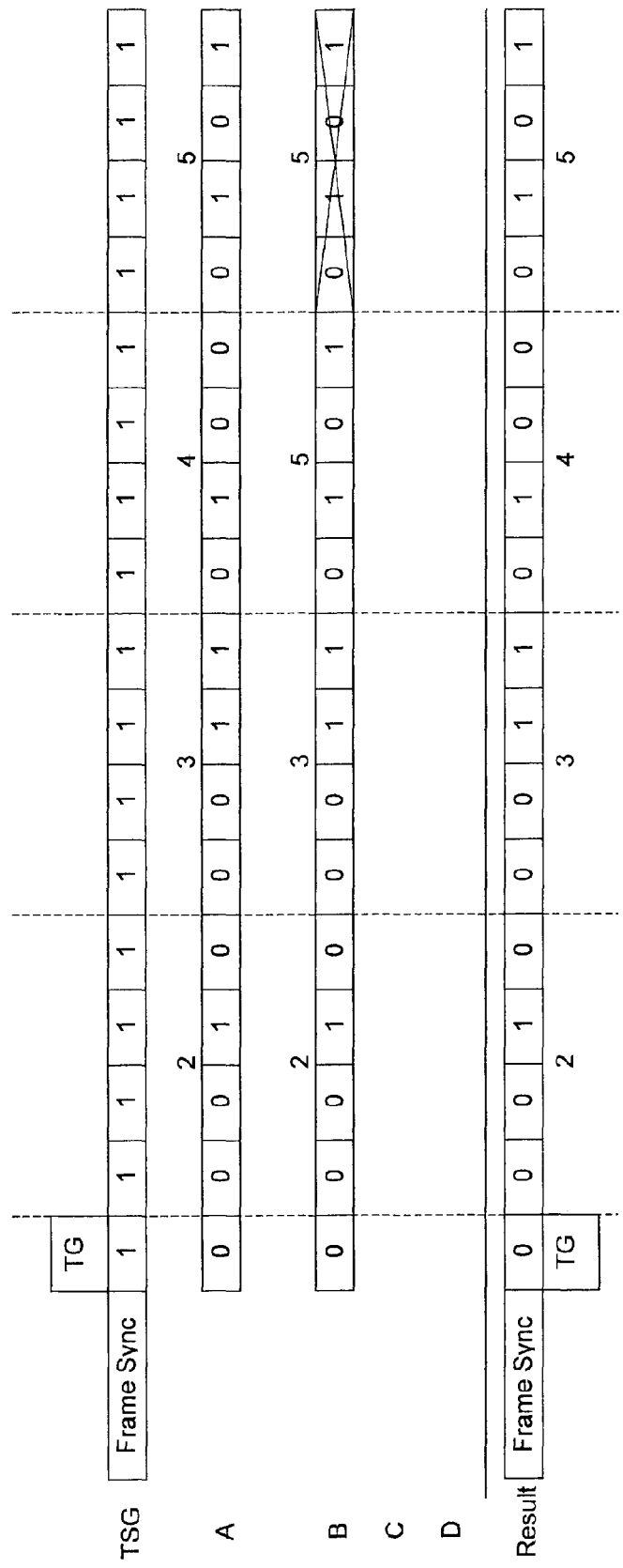

FIG. 11 schematically illustrates the manner of execution of the procedure or race to select the device with the lowest serial number, to make it become the time slot generator device $D_{TSG}$.

To do so, each of the devices that, based on the procedure described above at the end of the longest kΔT interval, deems to be the time slot generator device transmits a message having the structure of FIG. 8, which starts with the synchronisation sequence "frame sync" and which contains the number "0" in the first bit after the number "1" in the "frame sync". As stated, the first bit (field TG) in the command mask indicates that the device that generated the message requests a procedure for the assignment of the time slot generator function. The subsequent fields of the message generated by this device no longer have the meaning of the fields NF, M, ER, ES and D, but rather they are functional to the operation of identification of the device $D_{TSG}$. Therefore, the symbol "0" in the field TG is followed by a series of bits (in the illustrated example, 4×4=16 bit) that encode (in the binary system) the serial number SN of the device that is generating the message.

Merely by way of example, in FIG. 11 two serial numbers of two devices A, B are indicated:

device A: serial number 2345
device B: serial number 2355

Based on the logic that defines the recessive symbol "1" and the dominant symbol "0", when the two devices A and B attempt to transmit their own serial number to assign themselves the time slot generator device function, on the bus is transmitted solely the serial number of the device A, which is the lower, whilst the transmission of the serial number of the device B is inhibited.

Since the transmission of the symbols of the frame or message takes place in synchronous mode for both devices, and since the devices A and B are listening on the channel (i.e. they sample the voltage on the communication channel 1), at the time of the transmission of the twelfth symbol the device B detects that the symbol that is being transmitted ("1") is recessive, whilst the one that is transmitted in the same time slot by the device A is dominant ("0"). Consequently, the device B ceases to transmit. This is represented schematically in FIG. 11 deleting the four bits of the last set of four bits representing the serial number of the device B.

The result is that the serial number of the device A (number 2345 in decimal code, number 0010001101000101 in binary code) is "published" on the transmission bus. All devices read on the bus 1 the sequence of data indicated as the result of the "race" for the assignment of the role of time slot generator device and hence all devices excluding the device A know that they are not the time slot generator device. For this purpose, it is sufficient that each device compares its own serial number SN with the number (0010001101000101) that is transmitted on the bus. The device A takes on the function of time slot generator device $D_{TSG}$.

As mentioned above, the device A that has become the time slot generator device $D_{TSG}$ at this point assumes the time cadencing role transmitting on the bus 1 a sequence of messages or frames having the structure of FIG. 8, where the command mask contains only recessive symbols "1" (FIG. 4) and the parameters portion can be absent (or be constituted by a series of recessive symbols "1"). The transmission frequency at the instant is equal to $f_{symbol}$, but it can change over time in the manner described below.

Setting the Transmission Frequency

In general, in the system constituted by the communication channel 1 and by the devices $D_1, D_2, \ldots D_n$ there will be devices of different kinds, with ability to work at higher or lower clock frequencies. For all devices to be able to work correctly, it is necessary for the work frequency, set by the device $D_{TSG}$, to be equal to or smaller than the lowest among the maximum frequencies allowed by the various devices connected to the bus 1. To optimize the operation of the system and to exploit at the fullest possible extent the potential of the various devices, the work frequency of the system should not be too low. It must conveniently be equal to the lowest of the maximum frequencies allowed by the various devices, but no lower than that.

It has been seen that when the system is started, the initial frequency is equal to $f_{symbol}$, which is normally selected to correspond to a much lower value than the work frequency allowed by the various devices. Once the time slot generator device $D_{TSG}$ has been selected, a procedure for the optimisation of the transmission frequency, or more in general a procedure for the modification of the transmission frequency, can be carried out. The selection of a new transmission frequency takes place at the initiative of any one of the devices $D_1$, $D_2$, ... $D_n$ connected to the bus 1, including the device $D_{TSG}$. For this purpose, one or more of these devices can transmit a message having the structure of FIGS. 8 and 10, in which the field TG is equal to "1", since the time slot generator device has already been identified, whilst the field NF is set to "0". All the devices listening on the transmission channel 1 read the incoming message, identifying the beginning of the message through the "frame sync" sequence and, through the value "0" in the field NF, they detect that it is a starting message of a procedure for the selection of a new transmission frequency.

The device that generated this message places the transmission frequency to be used in the fields subsequent to the field NF. Typically, this frequency can be the highest frequency that the device in question is able to sustain. If multiple devices generate this message at the same time, based on a race based on the selection of the minimum value, it is clear that the result will be that on the bus 1 will be transmitted solely the message coming from the device that has the minimum value for the maximum sustainable frequency, based on the criterion described with reference to FIG. 7, because what takes place is simply a race where the device that writes the minimum value in the field that follows the bit NF wins. This is in fact the optimal value for the operation of the system: a higher value would make the device off sides, whilst a lower frequency would cause the system to lose effectiveness, because it would be lower than a value of the frequency that in any case all devices would be able to manage.

Figures 12, 13:
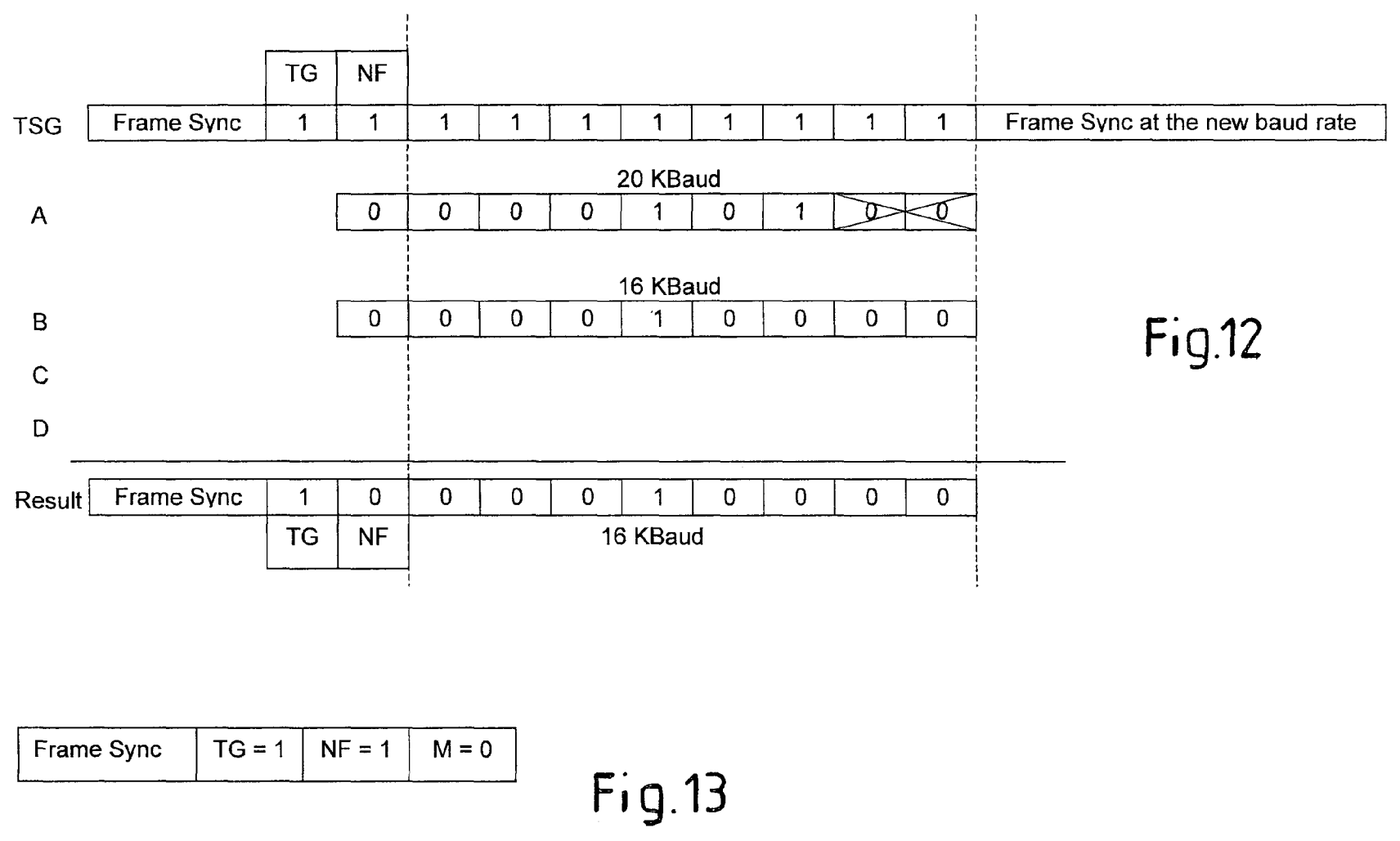

FIG. 12 shows an example of how the transmission frequency is updated on the basis of a simultaneous request in this regard coming from two devices, schematically indicated as A and B. Each of the two devices transmits a message that starts with a "frame sync" and places a value "1" in the field TG and a value "0" in the subsequent field NF.

All the other devices stop transmitting at this point, because a symbol "0" in the corresponding time slot (NF) is present on the channel. The transmission protocol provides that if the field NF is equal to "0", a certain number of successive bits will encode the frequency value requested by the device that generated the message. In the illustrated example, it was hypothesised that the value of the work frequency is encoded with a binary number at 8 bits and it is based on a base of 1 kBaud. In the illustrated example, the device A transmits a request to switch the work frequency to 20 kBaud whilst the device B asks to switch the work frequency to 16 kBaud. Since the frequency to be selected is the lower one of the two requested, the race is carried out according to the procedures for the selection of the minimum value, described with reference to FIG. 7.

In this case, the race procedure ends with the selection of the frequency requested by the slowest device, i.e. the device B. All devices receive from the transmission channel 1 a message that contains, after the synchronisation frequency "frame sync", a field TG containing the value "1" that is ignored, the subsequent field NF that contains the value "0" and the subsequent eight bits that encode the chosen frequency, i.e. 16 kBaud. Each device sets itself to work with this new frequency. In an optimal situation, even if not strictly necessary, all the devices concur in selecting the optimal frequency even if they have not selected the field NF. In this case, when a device transmits a message with TG=1 and NF=0, all the devices currently connected to the communication channel 1 "publish" their own maximum work frequency. On the communication channel, by effect of the logic described with reference to FIG. 7, will be transmitted the value of the lowest of these frequencies. In that moment, this is the optimal work frequency. All devices read the same frequency value and adapt themselves to utilize it in subsequent transmissions.

From the above description, provided with reference to the procedures for the selection of the time slot generator device $D_{TSG}$ and for the setting of the transmission frequency, it is readily apparent that the structure of the message is variable on the basis of the function that was selected through the symbols in the fields TG, ... D. The part of message that follows the first symbol "0" after the synchronisation frame "frame sync" has a structure that depends on which function (TG, NG, etc.) was selected. In fact, with reference to the two cases described above, the message that contains the symbol "0" in the slot TG presents, in the slots subsequent to the slot TG, a sequence of sixteen bits that contain the serial number of the device that generates the message. Vice versa, if the first slot containing the symbol "0" after the "frame sync" is the slot NF, in the message this slot NF is followed by eight time slots containing eight bits that encode the frequency of the device.

Hence, a characteristic of the transmission protocol of the present invention is that the structure of the message varies according to the content of the command mask (slots from TG to D).

The procedure described above with reference to FIG. 12 to select the work frequency can fail if, for example, an additional device is inserted in the system, or if a previously inactive device is activated, whose maximum compatible frequency is lower than the frequency that was selected previously. In other cases, it may occur that, due to some event, one of the devices is no longer able to manage the transmission at the chosen frequency.

When a situation of this kind occurs, the device in question can simply request the selection of a new work frequency, lower than the current frequency. This device is not able to interpret the transmission that is taking place on the bus. This condition of lack of comprehension of the transmission occurs even if on the bus is present only the signal generated by the time slot generator device $D_{TSG}$, which in any case functions at the previously chosen frequency, with which the slower device is incompatible. Hence, this latter device will not be able to correctly interpret the sequence of symbols "1" that the device $D_{TSG}$ generates in the absence of other communications on the channel, while understanding that the symbol "H" is not present on the bus (absence of communication and lack of a time slot generator device $D_{TSG}$).

The slower device can intervene destroying the ongoing communication, transmitting a symbol "L" on the bus 1 for at least a sufficiently long time $T_{lock}$, i.e. bringing the value of the voltage on the bus 1 constantly to "gnd". Since based on the above description, the value "gnd" on the channel prevents communication for all other devices, communication on the bus is interrupted, and the time cadence signal generated by the device $D_{TSG}$ is shut off or stopped as well. Once the time $T_{lock}$ elapses, all the devices abstain from all transmission and there no longer is any information traffic on the channel. The system, therefore, is in a situation identical to the one that occurs at start-up (lack of $D_{TSG}$) with a signal Vbus (symbol "H") on the bus 1. Thus, the selection of a new time slot generator device $D_{TSG}$ begins again, starting with a minimum work frequency $f_{symbol}$. Gradually, the system returns to a higher work frequency with the race procedure illustrated with reference to FIG. 12. However, since the slower device is now present as well, and it communicates with the others, it can impose a work frequency compatible with the value of maximum frequency allowed by said device. Actually, unlike what takes place upon start-up in the absence of a selected $D_{TSG}$, in this case the time slot generator device $D_{TSG}$ has already been selected previously and there is no need to change it. Hence, in alternative embodiment the procedure started by the slower device may serve the sole function of raising the transmission frequency from the minimum value $f_{symbol}$ to the maximum frequency compatible with all devices connected to the communication channel 1.

Naturally, this occurs only if the slower device is operating and participates in the procedure or race for assigning the frequency. If it is not active, the frequency can again rise above the maximum value of frequency of the slower device. This will not lead to any problems until said slower device starts operating again, repeating the communication interruption procedure described above.

In a procedure for updating the transmission frequency it is best to prevent the possibility of setting a frequency which is excessively high for one or more of the devices present in the system (which, at the time the working frequency is updated, for some reason is not active or does not participate in the frequency assignment race). If this event occurs, communications would be interrupted after a short time and a new cycle for the selection of the time slot generator device would be generated, and the frequency would gradually rise from the minimum value $f_{symbol}$ to a value compatible with that of the connected devices. To prevent this from occurring, in some preferred embodiments of the invention, following a request for updating the operating frequency, all devices may generate a message with the NF field equal to "0", followed by their own maximum manageable frequency. That is, the system can be forced to perform an update procedure in which all devices participate in the procedure or race for the determination of the operating frequency. This necessarily leads to the selection of the optimal frequency, i.e. the lowest among the maximum compatible frequencies of the individual devices $D_1, D_2, \ldots D_n$. When the devices read the symbol "0", they start to transmit their own operating frequency in the eight subsequent time slots.

Communication from and to Master Devices

The above description pertains to procedures that are carried out among various devices according to a "democratic" logic, i.e. without the supervision of a master or controller. However, there may be one or more master, controller or supervisor devices in the system, which may perform functions for the communication of parameters to one or more devices $D_1, D_2, \ldots D_n$, or which may modify some parameters of the system, or may perform other functions. Hereafter, reference will generically be made to a master device, i.e. a generic device that can request to carry out a function that takes precedence over that of other devices, for example setting a parameter, sending data to one or more of the other devices of the system or requesting data from one or more of the other devices.

In normal conditions, the master will keep listening on the bus 1, i.e., it will merely "sniff" the bus, reading the information that transit thereon. At the instant when the master has to intervene to perform a given function, it will attempt to access the bus 1 using the structure of the protocol present on the communication channel. Assuming that no device is transmitting, the time slot generator device $D_{TSG}$ transmits the synchronisation frames ("frame sync") followed by the sequence of recessive symbols "1" of the command mask (FIG. 8). When the master device has to start communication, it will select the slot "M" of the command mask writing the dominant signal "0" and it will start transmission. In other embodiments, if the time slot generator device $D_{TSG}$ transmits solely a sequence of symbols "1", the master can access the channel transmitting a sequence comprising the synchronisation frame ("frame sync") followed by the command mask containing the symbols "1" in the slots TG and NF and a dominant symbol "0" in the slot M (FIG. 10). The synchronisation frame, comprising a sequence of dominant symbols "0", will be overwritten to the sequence of "1" transmitted by the time slot generator device $D_{TSG}$.

If the system comprises a single master device, the message will have the form shown schematically in FIG. 13, with a symbol "0" in the field M. If, vice versa, the system comprises more than one master device, the message will have to identify uniquely which of these master devices is generating the message. For this purpose it is sufficient to encode, after the field or slot M of the command mask, the serial number SN of the master (or another possible unique identifier assigned during production), as schematically indicated in FIG. 14. For this purpose, a field having a pre-set length is reserved, i.e. one containing a pre-set number of time slots (in the example, 16 bits and hence 16 time slots).

As stated previously, the serial number SN of a generic device is unique and therefore in this way it is possible uniquely to identify which of the various master devices generated the message. If, simultaneously with a time slot cadenced by the device $D_{TSG}$, more than one master device starts to transmit a request of the type illustrated in FIG. 14, based on the procedure described generically with reference to FIG. 7, only the message generated by the master with the lowest serial number or unique SN code will survive and be transmitted on the bus 1. Alternatively, the 1's complement of the serial number can be transmitted, in which case the message of the master device with the highest serial number prevails and is transmitted.

The master device that won the race based on the value of its own serial number (or the sole master device that sent the message with the value "0" in the field M of the command mask) will take control of the bus 1 and will transmit the command for which it requested access to the transmission channel. This command will be encoded in a plurality of bits subsequent to the serial number, as schematically shown in FIG. 15. In this layout the section or portion called "real command" of the message transmitted on the communication channel 1 contains the command(s) or instruction(s) of the master.

Only the master that thus acquired control of the transmission channel 1 knows when it has finished transmitting the data about the real command it wants to impart and hence it will close the message queuing a new "frame sync" to the real command data. Thereupon, symbol generation ceases and control returns to the time slot generator device $D_{TSG}$.

If, for some reason, the time slot generator device $D_{TSG}$ is not present (because it has not yet been selected) or is faulty, the transmission channel remains at the high value "Vbus", i.e. the connected devices do not see traffic and detect a free transmission channel. They will then start a procedure or race for assigning the time slot generator function according to the criteria already described with reference to the system start-up.

Assignment of Virtual Addresses

In all that has been described thus far, some conditions have been hypothesised in which it is necessary to solve a conflict among multiple devices. This situation is rare and it can be solved using an identifying number that is unique by definition, for example the serial number assigned to the device in the factory. In general, this serial number is particularly long and hence it requires many bits to be encoded in the binary system.

There are other situations in the management of a system with multiple devices connected to a transmission bus, in which it is necessary to identify a device uniquely. To do so, each device must have its own unique address. This address can be determined by the serial number SN, which is unique by definition. However it is not particularly efficient from an information transmission viewpoint, because it is particularly long. The serial number $SN_i$ of a generic device $D_i$ must be unique for all manufactured devices and not just for those that were connected to a generic bus 1. The serial number SN therefore requires a high number of bits for its coding. The transmission of an address based on the serial number would thus require long times.

On the other hand, the system comprising N devices $D_i$ requires a number of unique addresses equal to the maximum number of devices present in the system, which is obviously far lower than the maximum unique serial number assigned to the devices. For example, if the system comprises eight devices, a unique address can be assigned to them using only three digits in the binary system, a quantity of digits that is certainly far lower than the one necessary to encode the serial number.

Therefore, in a preferred embodiment the protocol of the present invention provides for a different way to assign to each device $D_1, D_2, \ldots D_n$ of the system a unique address that is simpler and faster to manage.

The address is assigned always using a message having the structure of FIG. 10. Hereafter, two manners of assigning addresses, with a simplified or extended "race" procedure, will be described.

Before describing the address assignment procedure, the following should be noted. Let it be supposed that the total number of devices present in the system is $2^n$. Each device must have a unique address chosen among $2^n$ addresses, for example from 0 to $2^{n-1}$. Let it now be supposed that for each address it is necessary to verify a simple state of "presence" or "absence" of the device at a given address. A procedure managed for example by a master device could verify the status of the $2^n$ devices interrogating them sequentially and assigning a value "0" to the address where there is no device and the value "1" to the address where a device is present. In this case, it would be necessary to send $2^n$ symbols to have the complete status of the entire system, even if just a few devices are present. This approach is possible but it entails an enormous time expenditure and hence it is not efficient.

To avoid this drawback, in a preferred embodiment of the invention a generic address is characterized by a quantity M of numbers defining a position in a virtual structure with M dimensions. In the example that follows, the assumption is that M=2, i.e. an address formed by two numbers that identify a virtual two-dimensional grid structure will be used.

This way of encoding the addresses simplifies transmission and reduces the quantity of information to be transmitted. Solely for the purpose of facilitating the comprehension of this address coding system, let it be supposed that the devices of the system are arranged according to a grid of X rows and Y columns. The rows are indicated as "rack1,", "rack2", "rackX". In each row, Y positions or "slots" P1, P2, P3, . . . PY are identified. It must be understood that the term "rack" in this context must not be construed as a physical structure for housing the devices, but rather as the conventional name of a row of a virtual grid. Similarly, the term "position" or "slot" in this context must be understood to mean a position in the virtual grid and not a physical position in a structure of a physical rack.

In the hypothesis of a system that can contain up to $2^n$ devices and that must therefore enable to define $2^n$ addresses, the addresses can be divided in $2^a$ racks and $2^b$ positions or slots for each rack (i.e. $X=2^a$; $Y=2^b$), M which:

$$2^n = 2^a \times 2^b = 2^{(a+b)} \text{ where } n = a+b$$

In this way, each position or address can be defined using $(2^a + 2^b)$ symbols where the $2^a$ symbols are used to define a rack and the $2^b$ symbols are used to identify a position or slot in a rack. This kind of coding of the unique addresses of the $2^n$ devices of the system enables considerable time saving in data transmission.

As mentioned, different address groupings can be hypothesised, for example in a three-dimensional grid or in a generic structure with M dimensions, subdividing the addresses as follows:

$$2^n = 2^a \times 2^b \times 2^c \times 2^d \ldots = 2^{(a+b+c+d\ldots)}$$

This stated, the simplified procedure for assigning the addresses will now be described with reference to a structure with a two-dimensional grid.

The simplified procedure consists of carrying out a "race" for the assignment of one address at a time. As for other actions requested from one of the devices of the system through the protocol described herein, in this case too the request of a race for assigning unique addresses takes place through a message generated by one of the devices and having the generic structure schematically indicated in FIG. 10. The device that generates the request transmits on the bus 1 the message schematically indicated in FIG. 16. After the "frame sync", the TG, NF, M, ER fields contain a symbol "1" and the subsequent field SR contains a symbol "0". As mentioned previously, the "frame sync" and the command mask containing recessive symbols "1" can be transmitted by the time slot generator device $D_{TSG}$, in which case the device that requests the race for assigning the virtual addresses can merely write the dominant symbol "0" in the time slot SR of the command mask. Vice versa, in other embodiments the device that requests the race for assigning the addresses can transmit on the communication bus 1 a "frame sync" synchronisation frame followed by a command mask containing four recessive symbols "1" and a fifth dominant symbol "0", in the time slot marked as SR (FIG. 10).

In the example of FIG. 16, it is hypothesized that four devices indicated as A, B, C, D simultaneously generate a message of this kind. All the devices connected to the bus 1, since they are constantly listening, i.e. constantly receiving the signals present on the bus 1, including the time slot generator device $D_{TSG}$, are informed that a request for the assignment of addresses through a simplified procedure was made.

The address assignment procedure at this point is managed by the device $D_{TSG}$. This device, having received an address assignment request (defined by the presence of a symbol "0" in the corresponding field or slot SR of the message present on the bus 1) generates a sequence of symbols "1" equal to the number of available "racks". This number is a figure that is communicated to the system at the moment of its installation and that may be changed for example by reprogramming or through an external command forced by a master. In practice, the criterion for assigning the addresses with subdivision into racks enables to organise the addresses according to a number of racks that can be changed over time also according to specific requirements for the management or organisation of the addresses.

Let it be supposed that the system has four racks, each having eight positions. In this case, therefore:

$2^a=4$, hence a=2
$2^b=8$, hence b=3.

FIG. 17 schematically shows the message sent by the $D_{TSG}$. The references R0, R1, R2, R3 indicate time slots that follow the slot SR and in which the time slot generator device $D_{TSG}$ places a symbol "1". During the sequence of symbols "1" that follow the slot SR, one or more of the devices A, B, C, D that requested the address assignment race can insert a symbol "0" in any one of the slots R0, R1, R2, R3. In the example shown in FIG. 17, the devices A and B have placed a symbol "0" in the slot R1 and the devices C and D have placed a symbol "0" in the slot R2. In the final part of the diagram of FIG. 17, the resulting message on the bus 1 is shown. This message is read by all devices, including the time slot generator device $D_{TSG}$, connected to the transmission bus. Therefore, all devices are aware of the fact that there is an address assignment race for two racks, since a symbol "0" is present in two of the four slots R0; R1, R2, R3.

The time slot generator device $D_{TSG}$, that manages the address assignment race, decides which of the two races is carried out first. Any selection criterion can be used. For example, the simple criterion can be adopted of carrying out the address assignment race in the lowest rack among those where an assignment request is present. In the case at hand, the rack R1 prevails among the racks R1 and R2 and hence the device $D_{TSG}$ carries out the address assignment race between the two devices A, B that requested it for the rack R1.

The rack selected by the device $D_{TSG}$ must be communicated on the bus 1. This takes place (FIG. 18) inserting, in the message transmitted by the device $D_{TSG}$, after the sequence of four slots indicative of the four available racks (R0, R1, R2, R3), a binary number (in the example, with two digits) that indicates the address of the chosen rack, in this case the second rack (R1) that has the number 01.

The four devices A, B, C, D that are participating in the address assignment race transmit, on the bus 1 during the time slots for the transmission of the address of the rack on which the race is taking place, a sequence of symbols "H". The transmission by the device $D_{TSG}$ continues, to enable to select the position to be assigned to the device that will win the race on the rack R1 (the address 01) that has been selected. FIG. 19 shows the following portion of the message generated by the device $D_{TSG}$ that makes the number "01", which indicates the rack R1, be followed by a series of slots in which it places the symbol "1". The number of said slots, indicated as P0, P1, P7 in FIG. 19, matches the number of positions in a rack, hence eight positions in the illustrated example.

All devices connected on the bus read this part of message and each device that occupies one of the positions P1, P2, . . . P7 in the rack 1 will write a symbol "0" in the corresponding slot. For example, in FIG. 19 it is hypothesised that a single generic device "x" already has the address corresponding to the position P3 on the rack 1 and hence will write a symbol "0" in the corresponding time slot.

By effect of the rule defined initially, based on which the symbol "0" is dominant and the symbol "1" is recessive, on the bus will be shown the message indicated at the bottom in FIG. 19, where the sequence "01" indicative of the rack 1 on which the address assignment race is carried out is followed by the sequence 111 0 1111. This sequence is received by all devices connected to the bus, which are consequently notified that the only occupied position in the rack 1 is the fourth position. The devices A and B that are competing for the assignment of an address in the rack 1 know that all positions are available except the fourth one.

The next step consists of the transmission, by the device $D_{TSG}$, of a new sequence of symbols "1" with a length equal to eight time slots (equivalent to the number of positions in the rack). Each of the two devices A and B will write a symbol "0" in one of these slots, except in those already selected. In the example illustrated in FIG. 20, which shows this message portion, the device A has written a symbol "0" in the second position (P1) and the device B has written a symbol "0" in the sixth position.

The next step consists of associating to the position selected by each of the devices A and B the related serial number SN. Let it be supposed that the serial numbers of the two devices A and B are as follows:

device A: serial number SN 2345
device B: serial number SN 2355

To do so, the device $D_{TSG}$ selects one of the positions chosen by the devices A and B, i.e. the position P1 and the position P5. Starting from the position P1, the device $D_{TSG}$ generates a sequence of symbols that represent with three binary digits the binary number corresponding to the position P1, i.e. 001. This number indicating the chosen position is followed by the transmission, by the device $D_{TSG}$, of a sequence of as many symbols "1" as is necessary to encode in binary code the serial number of the system devices. In the example illustrated herein, each serial number SN is formed by four digits of the decimal system and hence it is encoded by four sets of four binary symbols. FIGS. 21A and 21B show the sequence of sixteen symbols "1" that the device $D_{TSG}$ generates in sequence after the binary code 001 that identifies the position P1. Of the two FIGS. 21A, 21B, the second one must be considered the continuation of the first.

During this step, each of the devices (A and B) that are participating in the assignment of the address will write on the bus 1 its own serial number encoded in binary code as a sequence of symbols "0" and "1" (or "0" and "H"). In FIGS. 21A, 21B this sequence of symbols generated by the device $D_{TSG}$ is indicated (in the row distinguished by the acronym TSG), as well as the one generated by the device A (generated sequence: 0010; 0011; 0100; 0101, binary coding of the decimal number 2345) and the bottom of the figures shows the sequence of symbols resulting on the bus 1 ("result") as a consequence of the logic of dominance of the symbol "0" with respect to the symbol "1" or "H".

The sequence of symbols generated with this procedure on the bus 1 communicates to all devices that the address defined as rack 1, position 1 is assigned to the device with serial number 2345. In subsequent communications from any device to the device A with serial number 2345, it will be sufficient to use the address expressed in terms of rack and position, i.e. the address 01 (rack 1), 001 (position 1), instead of the serial number SN.

With a new sequence of symbols "1" similar to the one of FIGS. 21A, 21B, that starts with the three symbols "1,0,1" the virtual address corresponding to rack 1, position 5 (P5) is assigned to the device B, which will communicate its own serial number SN on the bus 1.

In the above description of the procedure for the assignment of the addresses, it was hypothesised that the two devices A and B that participated in it have requested to occupy different positions in the same rack 1: position P1 for the device A and position P5 for the device B. The position P1 in the rack 1 was attributed to the device A.

Figure 22B:
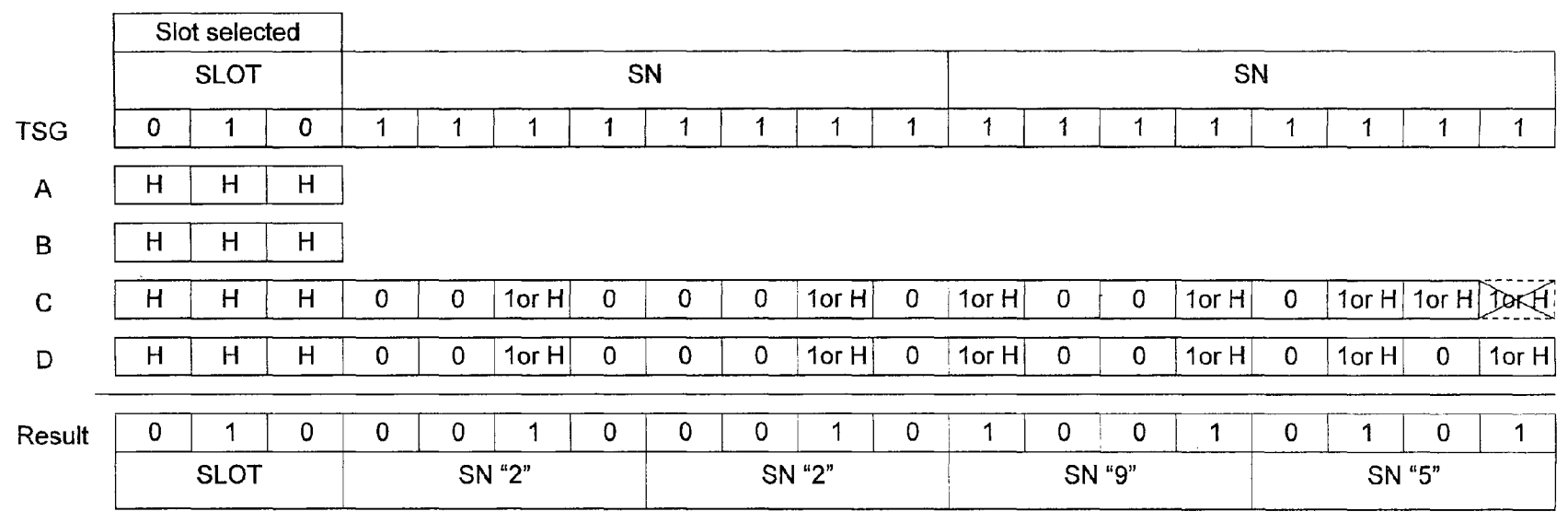

The protocol also enables to resolve a possible conflict in the case that two (or more) devices compete for the same address. The way in which such a conflict is resolved will become readily apparent from FIGS. 22A and 22B and from the description that follows. FIGS. 22A, 22B show the same sequence of symbols already described with reference to FIGS. 19 to 21B. However, unlike the previous case, in this sequence it has been hypothesised (see FIG. 18) that the devices C and D have requested the assignment of an address in the rack in position 2 (P2). Therefore, the device $D_{TSG}$ will generate the sequence of symbols "1,0" to indicate the selected rack. This sequence is followed by the first sequence of symbols "1" with a number equal to the number of positions in the rack (eight positions P0, P1, P2 . . . P7), whose purpose is to verify which one of these seven positions is still available (see FIG. 19). Since no device is associated to a position of this rack, no symbol "0" is written in this sequence of time slots. All positions are available. The device $D_{TSG}$ then writes a sequence of eight additional symbols "1", during which the devices C and D will request the assignment of their own position writing a symbol "0" in the selected position. In the example illustrated in FIG. 22A, both the devices C and D choose the position P2 (third position in the sequence).

Hence, a conflict arises between the two devices. This is resolved assigning the address of the rack 1, position P2 to the device, among the devices C and D, whose serial number is lower. Assume the following serial numbers SN:
device C: serial number SN 2297
device D: serial number SN 2295

FIG. 22B shows the sequences of symbols transmitted by the devices C and D at the sixteen time slots generated by the device $D_{TSG}$ and used for the publication on the bus 1 of the serial number of the device or devices competing for assignment of the address. Since the device C has the higher serial number (2297), it loses the address assignment race, and the address is assigned to the device D.

The device C which has been left without a virtual address may request (generating a message of the type shown in FIG. 16) a new address assignment race.

The procedure described above is a simplified race for the assignment of the available virtual addresses, in which a dedicated sequence of symbols (FIGS. 19-21B) is used to assign a single virtual address to a device. In some improved embodiments of the invention, the protocol may provide for the possibility of assigning all the virtual addresses available in a row or rack with a single step. This procedure, which will be indicated as "extended race", may be requested with a message of the type indicated in FIG. 16, where however in the slot ER is inserted the symbol "0" by the device requesting the start of the address assignment race.

As for the simplified race, for the extended race the message starting the procedure can be generated by the device $D_{TSG}$, or by any other device. Since all devices are connected to the bus 1 to be able to transmit and simultaneously read the symbols present on the bus, the procedure can in fact be started by any device. This also holds true for the other procedures described. The device $D_{TSG}$ has, with respect to the remaining devices, the only additional functional characteristic of serving as a communication "metronome". As mentioned previously, any device among those connected to the communication bus can operate as $D_{TSG}$ and the $D_{TSG}$ function can be taken over by different devices over time.

The layout of FIG. 23 schematically shows a situation in which four devices, still indicated as A, B, C, D, simultaneously request the assignment of a virtual address through an "extended race" of this kind.

The time slot generator device $D_{TSG}$ generates a new message starting from the "frame sync", followed by a sequence of time slots, each containing the symbol "1", until, at the fourth slot subsequent to the "frame sync", indicated as ER, the four devices A, B, C, D transmit a dominant symbol "0" on the bus.

As soon as the device $D_{TSG}$ detects the dominant symbol "0" in the slot ER, it starts transmitting a sequence of symbols "1" whose number matches the number of available racks, four in the illustrated example. The devices A and B request the assignment of an address on the second rack (R1) and the devices C and D request the assignment of an address on the third rack (R2). The last line of FIG. 23 shows the message that actually appears on the bus 1 (result), generated according to the rule of the dominance of the symbol "0" relative to the symbol "1". From the message, it is clear that:
   a) an extended address allocation or assignment race is requested, and
   b) there are devices that request the assignment of addresses on the racks R1 and R2.

Figure 24A:
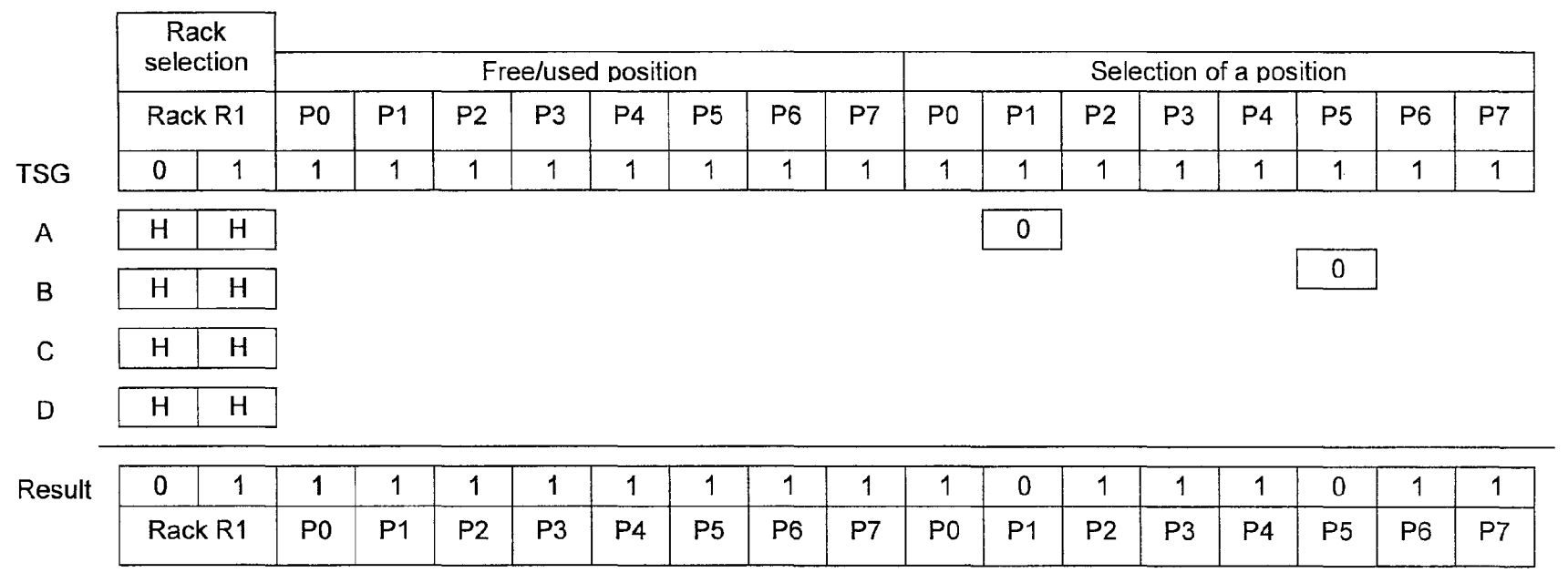

The subsequent FIGS. 24A, 24B (which show the subsequent sequence of symbols that follow those of FIG. 23, as FIG. 24B is the continuation of the outline of FIG. 24A) show the sequence of symbols for the assignment of the first two addresses to the devices A and B in a single step. The sequence can continue to assign the virtual addresses to the subsequent devices C and D. In FIG. 24A, the device $D_{TSG}$ generates the sequence of symbols "0,1" that indicates the first of the racks (rack 1) on which the address assignment operation is carried out. A sequence of eight symbols "1" follows to verify which one, among the positions P0, P1, . . . P7 is already occupied. In the example, no position is occupied. The sequence of eight additional symbols "1" follows to enable the devices A and B to select the desired position. The device A selects the position P1 and the device B selects the position P5. The device $D_{TSG}$ then generates the number of three binary digits ("0,0,1") indicating the first of the positions selected (position P1) followed by a sequence of sixteen slots containing the symbol "1". In these slots, the device A writes its own serial number (2345) in a binary code. The remaining devices do not transmit. The device $D_{TSG}$ then generates a sequence of three binary digits ("1,0,1") that indicates the position P5, followed by a new sequence of sixteen symbols "1" in as many time slots, in which the device B, which requested the position P5 ("1,0,1") will write its own serial number 2355 in binary digits. The subsequent step is a new sequence, similar to the one in FIG. 24A, with the selection of the rack 2 (code "1,0"), followed by the same sequence illustrated in FIGS. 24A, 24B for the assignment of the virtual addresses to the devices C and D that requested an address in the rack 2.

In case of conflict (two devices requesting the same position on the same rack), the procedure described above with reference to FIGS. 22A, 22B is followed.

As is readily apparent from the above description with reference to the procedure for the assignment of virtual addresses, the time required to assign a virtual address (rack, position) to each device is the longer, the more the requested positions are scattered on multiple racks. If all the positions of a single rack are occupied at each step of the address assignment process, the time necessary for assignment of the address is drastically reduced. This is all the more important, the higher the total number of devices and hence the number of racks and positions for each rack. To reduce these address assignment times, the devices can be programmed in such a way that when the first device that requests assignment of a position selects a given rack, the others are forced to request assignment of a position on the same rack, so that the possibility increases of rapidly occupying all the position of a single rack, avoiding the dispersion of the virtual addresses on a high number of racks, which require a repeated iteration of the same steps for the assignment of the virtual addresses.

Exchange of Data Among Devices

The above description pertains mainly to system management operations that are functional to the exchange of information (assignment of addresses, selection of the time slot generator device, determination of the transmission frequency), but not to the actual transmission of information.

When a device desires to receive or transmit information, it can use a message of the type indicated in FIG. 10, inserting the dominant symbol "0" in the time slot indicated as D, i.e. the sixth slot following the synchronisation sequence ("frame sync"). It is noted that this is the slot with the lowest priority, which means that the data transmission function has a lower priority than management functions, i.e. those functions that are required to set up the system constituted by the bus and by the devices connected to it, including the selection of the time slot generator device, the selection of the frequency transmission and the assignment of the virtual addresses to the various devices.

When a generic device requests the transmission of information writing the symbol "0" in the slot D of the command mask, all devices connected to the bus 1 receive the message and, since the symbol "0" in the slot D is dominant, all devices read the symbol "0" in this slot. This presupposes, based on the aforementioned priority criterion, that no device has requested the transmission channel to perform anyone of the functions described previously, writing a symbol "0" in one of the slots with higher priority (TG, NF, M, ER, SR).

In this case, too, as in other situations described above, the sequence of synchronisation frame and command mask with recessive symbols "1" can be transmitted by the time slot generator device $D_{TSG}$, and the device that requests the transmission of the data merely writes the dominant symbol "0" in the slot D. Vice versa, for example if the device $D_{TSG}$ generates only a sequence of recessive symbols "1", the device that requests the transmission of data can intervene writing on the communication bus 1 the sequence of synchronisation frame "frame sync", followed by the command mask with the symbols 1,1,1,1,1,0. In other embodiments, the time slot generator device can also carry out functions of interrogation of the other devices, in which case the device $D_{TSG}$ will necessarily generate the synchronisation frame and the command mask.

One of the functions that can be carried out in data transmission mode is the sharing of multiple data to communicate to all devices the highest (or lowest) value among the transmitted and shared data. With reference to FIG. 6, an example has been illustrated whereby a value that is the highest (or the lowest) among all homologous values, for example of measurements taken by multiple devices, can be shared among all (or some) of the devices in the system. If the system is designed to share only one type of data, fixed in terms of position and length, the manner of sharing the data consists simply in causing the value of the data to be transmitted on the bus 1, to one or more devices that request it, making it follow the slot indicated as D in the diagram of FIG. 10.

Let it be supposed that the generic devices B and C have to share on the bus 1 a certain data item that assumes the value 5 for the device B and the value 7 for the device C. FIG. 25 schematically shows what occurs in this case, in the hypothesis that the transmission is managed by the time slot generator device $D_{TSG}$.

In one embodiment, the device $D_{TSG}$ generates the message in which a "frame sync" is followed by a sequence of five symbols "1" for the slots TG, NF, M, ER, SR, whose functions were described above, and hence a symbol "0" in the slot D. The data to be shared were established as position and length and they occupy a field of four time slots, each of which in the message generated by the device $D_{TSG}$ contains the symbol "1". In this case, too, the device B or the device C can initiate the generation of the data frame starting from the synchronisation frame "frame sync".

In the diagram of FIG. 25, in the time slots following the slot D containing the dominant symbol "0", the devices B and C write a number in binary notation corresponding to the data they have to share, i.e.
  the device B will write the sequence 0,1,0,1 that corresponds, in binary notation, to the number 5 in decimal notation;
  the device C will write the sequence 0,1,1,0 that corresponds, in binary notation, to the number 7 in decimal notation.

Since the criterion of the selection of the minimum value is followed, with the symbol "0" dominant with respect to the recessive symbol "1", the resulting message on the bus 1 will be the one shown in the lower part of the diagram of FIG. 25 and indicated as "result", i.e. the value (0,1,0,1=5) transmitted by the device B will be transmitted to all devices. The last symbol ("1") generated by the device C is suppressed by the dominant symbol "0" written by the device B.

If the request is for the highest value among those provided by the devices B and C to be transmitted on the bus 1, the criterion of the 1's complement, already described with reference to FIG. 6 will be followed.

In this example, since a fixed length of time slots is dedicated to data sharing (four time slots according to the example of FIG. 25), the system is relatively rigid.

To make data transmission more flexible, according to an improved embodiment of the invention the device that initiates the transmission of shared data can provide, after the symbol "0" in the slot D of the respective message, a more complex and articulated sequence of time slots and related symbols, programmed to define, for example:
  the type of information or data to be transmitted;
  the length of the data;
  the actual content that defines the information to be transmitted;
  a sequence indicating the end of the data transmission.

Figure 26:
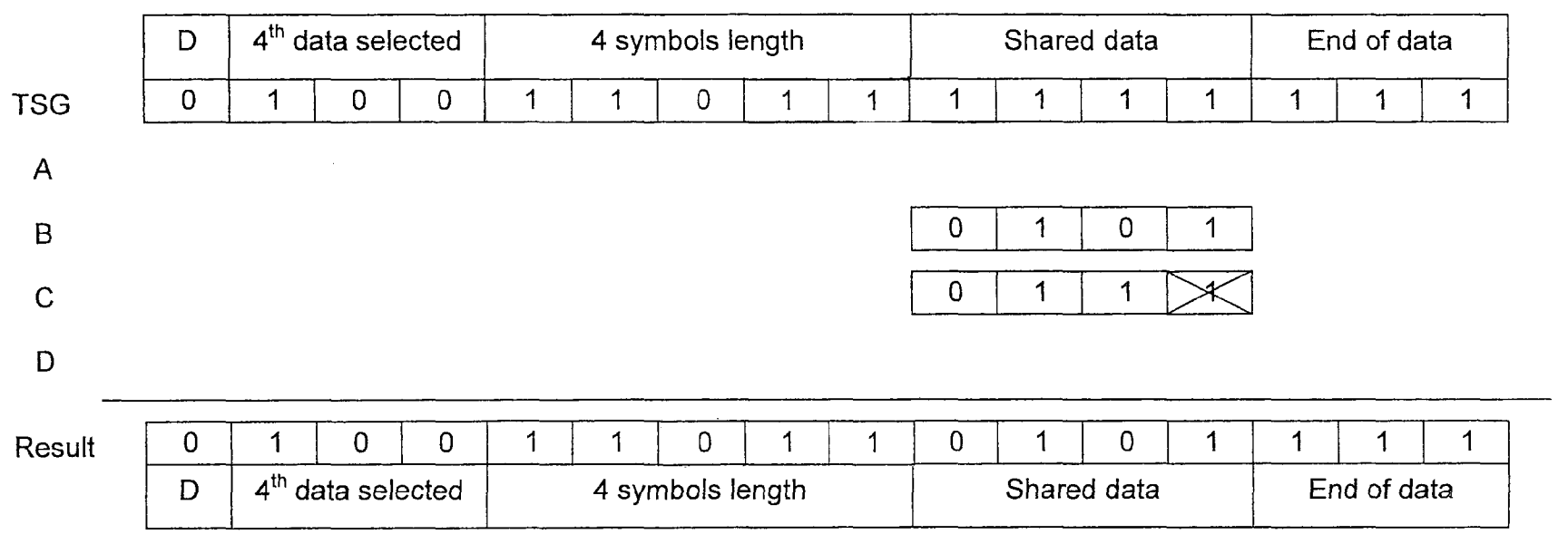

FIG. 26 schematically shows a transmission criterion of this type. In the diagram of FIG. 26, the following was hypothesized:
  1. the transmission is managed by the device $D_{TSG}$ that defines the type of data to be transmitted and sets the length thereof;
  2. after the slot D, time slots divided in four sections follow;
  3. the first section or portion (indicated as "$4^{th}$ data selected" in the diagram of FIG. 26) contains, in the illustrated example, three time slots and defines the type of data selected for the transmission. The number of three time slots is purely indicative and it may change for example according on the number of different types of data to be managed. In the example seven different types of data are selectable, encoded with N=3 bits. Hence, in the illustrated example, the fourth type of data was selected for transmission (100=4 in decimal notation);
  4. the second section or portion (indicated in FIG. 26 as "4 symbols length") defines the length of the data field to be used. In the illustrated example, a sequence of five bits, i.e. five time slots, is dedicated to the definition of the length of the data field. Since in the case of multiple devices requesting the transmission of data with different lengths, the length (number of slots) must be sufficient to contain the longest data item, in the portion "4 symbols length" the 1's complement of the required length of the data field is transmitted. In the illustrated example, the device $D_{TSG}$ has to transmit a data item that occupies 4 time slot (4=100 in binary notation). Consequently, the 1's complement of the binary number 00100, i.e. the number 11011, is placed in the field "4 symbols length". The data item that has to be transmitted using the subsequent section ("shared data") of the message has a length of four bits (00100=4 in decimal notation);

5. the third section of the message generated by the device $D_{TSG}$ (indicated as "shared data" in the diagram of FIG. 26) contains four bits or time slots, each containing a symbol "1". This field contains four bits or time slots, since this is the data length set by the preceding section ("4 symbols length"). These slots are those available for the transmission of the shared data;

6. two generic devices B and C write, in the section ("shared data") formed by the four slots defining the shared data, the value they wish to transmit. The device B writes the value 0101, whilst the device C writes the value 0111. Since the latter value is higher, the lower value written by the device B wins and it is transmitted on the bus 1, as indicated in the bottom part of the diagram of FIG. 26. A reverse logic can be adopted using the 1's complement;

7. the transmission sequence ends with a string of three time slots, in which the device $D_{TSG}$ writes a sequence of three recessive symbol "1". This string represents the end of the transmitted data (in FIG. 26 this section is indicated as "End of data").

The message portions that follow the slot "D", with the exception of the last sequence "111" that represents the end of the data string, may be repeated several times. It is thus possible for example to transmit several times the same data, for example a measurement, or to transmit a series of different data.

A situation in which it may become necessary to transmit the same data several times on the communication bus 1 is the one that occurs in a control loop, for example a temperature control or a current regulation in a current share. In both cases, it is necessary to transmit the controlled parameter (temperature, or current), to activate a control and subsequently to retransmit the controlled parameter to verify the effect of the activation of the control.

If multiple data are transmitted on the communication channel, the data sequence is closed by a sequence of symbols "1,1,1" that constitutes an end marker of the sequence of shared data.

The data end marker (end of data) comprises a sequence of recessive symbols. This enables any device to request the publication (i.e. the transmission on the channel 1) of a new data item. In fact, when the recessive sequence 1, 1, 1 appears on the bus, a generic device that has to transmit a shared data item will do no more than overwrite its own shared data item on the three bits defining the data end marker.

The length of the data end marker, constituted by the sequence of recessive symbols, can be adapted to the size of the sequence of symbols necessary to transmit the data provided by the protocol.

In general, it is necessary for all devices to know the length (in terms of bits) of each section of the message related to the transmission of shared data, shown schematically in FIG. 26. That is, the lengths of the various sections or portions of the message are set a priori and communicated to the devices. If, for any reason, the set length for one or more of these sections is no longer sufficient for the requirements of the system, a reprogramming step, for example managed by a master device, can be provided.

Let it be supposed, for example, that the multiplicity of different data that it may be necessary to transmit increases, so that it is no longer possible to encode a number identifying the type of message using just the three bits provided in the portion or section indicated as "$n^{th}$ data selected", that follows the field D of the command mask. In this case, the length of this field is reprogrammed. Similarly, the lengths of other fields illustrated in FIG. 26 can be reprogrammed, in particular the field that defines the lengths of the shared data, i.e. the length of the field indicated as "4 symbols length" in FIG. 26.

In the described example, there is a single field (D) in the command mask, through whose selection the exchange of data among devices is initiated. Two possible, mutually alternative, modes of data sharing have been described. In some embodiments, the command mask may contain two fields D1 and D2 instead of a single field D, to share data according to one or the other of the two procedures described above with reference to FIGS. 25 and 26 respectively. In this way, it is possible to use two data transmission criteria with the same transmission protocol.

In a preferred embodiment of the invention, the protocol can provide another command or procedure, defined as C (Configuration), whose purpose is to configure the length of a plurality of fields necessary for communication. For this purposes, the command mask (FIG. 10) can be modified and contain an additional field. FIG. 10A shows the synchronisation frame and the mask of the command modified with the addition of a field indicated as "C" positioned between the field NF and the field M. When the fields TG, NG contain the recessive symbol "1" and the field "C" contains the dominant symbol "0", the system activates a procedure for the configuration or definition of the length of a series of fields as illustrated below with reference to a possible embodiment. Since the field "C" is between the field TG and the field NG, the configuration function is the one with the highest priority after the selection of the time slot generator device $D_{TSG}$.

In some embodiments, a generic device (which can be the time slot generator device $D_{TSG}$ or any of the devices $D_i$) can request an update of the size of one of the fields to be transmitted. For this purpose, it is necessary uniquely to encode the parameters whose length can be modifying, assigning an identifier code to each of these fields. It is also necessary to establish a priori: the size (i.e. the number of fields or time slots) necessary to encode the highest possible number of modifiable parameters; and the size (i.e. the number of fields or time slots) necessary to encode the highest possible value for each data item that can be transmitted by any one of the devices of the system.

One or more devices can then request the update of the size of the field identified by a given identifier code by initiating the "configuration" procedure, publishing the dominant symbol "0" in the time slot "C" of the command mask. This is followed by the identifier code of the parameter whose length has to be set or modified. As stated, the length of the identifier code is set a priori. The identifier code is followed, in a field whose length is also determined, by the binary number that indicates the length, defined in terms of number of time slots, to be assigned to the parameter in question. This length is defined as 1's complement of the actual length, so that in case of simultaneous request for update/modification of the size of the same parameter by two device, a race takes place with the victory of the minimum value of the 1's complement and hence of the maximum among the requested values. For example, suppose that the following parameters are encoded with the binary numbers associated to each data item:

Identifying Code of a shared data item: 0001
Length of shared data: 0010
Personal identifier of a device: 0011
Length of personal data: 0100

Number of racks: 0101

Number of positions per rack: 0110

Suppose that, by default, the identifying code of the shared data (parameter 0001) is 3 time slots long, i.e. is encoded on 3 symbols and that the length of the data item is 4 time slots. In this way, up to 7 different data items ($2^3-1$) can be encoded, since the highest available identifying code is 110, whilst the sequence 111 is reserved for the end marker. The maximum value of the data to be shared, instead, is equal to $2^4-1=15$, also considering that the sequence 1111 is reserved for the end marker.

Let it be supposed, moreover, that the list of the modifiable parameters can be covered with 4 symbols and that the maximum length of each data item can be coded on 6 fields. This means that the maximum number of encodable parameters is 15 symbols and the maximum length for each parameter is 63 symbols, since the value "0" is not usable.

Let it be now supposed that a device requests to raise from 3 to 4 the number of fields or time slots on which the identifying code of the data is to be encoded and to raise also the maximum value of the data item to be transmitted, to shift from a codification on 4 symbols to a codification on 5 symbols.

To do so, this device will transmit, after a "frame sync", a dominant symbol "0" in the field "C" (FIG. 10A). This will inform all devices connected to the communication channel that there is a length modification request. This is followed by the sequence of 4 symbols 0001, which identifies the type of field whose length is to be modified. The sequence 0001 identifies the code identifying the data. A sequence of 6 symbols follows in which the 1's complement of the length is inserted (100 in binary notation, i.e. 4 in decimal notation) that is to be assigned to the parameter in question. This sequence is thus equal to 111011 (1's complement of the number $000100_2=4_{10}$, where according to a known convention the subscript "2" indicates the binary notation and the subscript "10" indicates the decimal notation of a number).

This sequence imposes the change of the length dedicated to the identifying code of a shared data item. Since the same device also requests the modification of the length dedicated to writing the value of the shared data item, from $4_{10}$ ($0100_2$) to $5_{10}$ ($0101_2$), it will have to transmit in succession a sequence of 4 symbols containing the binary number 10, which corresponds to the identifying code of the length of the field, followed by the 1's complement of $101_2$ (i.e. $5_{10}$) encoded again on six symbols, i.e. 111010. Use of the 1's complement is determined by the fact that in case of simultaneous request from multiple devices, the one requiring the maximum value (and not the minimum value) for each field will have to win.

In general, after setting the number of symbols on which the identifying code of the possible parameters managed by the system is to be encoded and the number of symbols on which the length of each parameter is to be encoded, the configuration command "C" then enables any device to impose a given length (smaller than the maximum admissible length) to encode any parameter among those to be configured. The configuration is started by inserting the dominant symbol "0" in the field "C" of the command mask (in the configuration of FIG. 10A), followed by one or more sequences, each of which contains the code of the parameter to be configured and the 1's complement of the length to be assigned to that given parameter. The same device can perform a configuration of one or more parameters (two in the above example) in a single step, i.e. after writing the dominant symbol "0" in the time slot "C" of the command mask. Once it completes writing the sequences of symbols necessary to encode the parameters the device wants to configure, the device will transmit the end marker (sequence of symbols "1"), thus communicating to all system devices that the configuration step has ended.

In the example described with reference to FIG. 26, it was hypothesized that the time slot generator device $D_{TSG}$ publishes on the communication bus 1, in the first section following the slot D, the type of data to be transmitted. In this hypothesis, therefore, the transmission is managed by the $D_{TSG}$ even with regard to the nature of the data to be transmitted on the bus 1. In a possible different embodiment of the protocol according to the invention, or in an alternative communication mode within a protocol that also provides the solution described above, the time slot generator device $D_{TSG}$ may not know the type of data that can be shared among the various devices, but it knows only the total number of type of data that can be shared. For example, let it be supposed that the system is programmed to share seven different types of data. The generic system device does not necessarily have to know what data they are, but rather it must know only that the transmission protocol must support the sharing of seven different types of data. Hence, a string of three bits in as many time slots is sufficient to define the type of data. The type of data to be transmitted is identified not by the $D_{TSG}$ but rather by the generic device that requests access to the bus to publish the data item. In this case, the time slot generator device $D_{TSG}$ will write in the section dedicated to the type of data a sequence of three recessive symbols, i.e. the sequence 1,1,1. This sequence also constitutes the end marker of the string of shared data.

Consequently, if no device requests the transmission of shared data on the bus, the dominant symbol "0" in the slot D is followed directly by the end marker 1,1,1.

Vice versa, if a generic device $D_i$ has to transmit a data item, it will overwrite on the sequence of recessive symbols 1,1,1 a three-bit binary number that indicates the nature of the data or parameter to be shared, i.e. the type of data that the device wants to transmit (publish) on the bus 1 (corresponding to the "data selected" section in FIG. 26). This three-bit string ("data selected") may be followed by a string ("symbol length") that indicates the length of the data or parameter to be transmitted. This is followed by the shared parameter or data ("shared data" section), which occupies a number of bits defined by the preceding string or section ("symbol length").

If multiple devices attempt to access the bus overwriting the type of data to be shared on the end marker 1,1,1 generated by the $D_{TSG}$, the conflict is resolved on the basis of the criterion of the race on the minimum value: the winning device is the one that requests access to the communication bus 1 to communicate the data or parameter identified by the lowest number. For example, let it be supposed that:

the device A requests to transmit the second type of data identified by 0,0,1 the device B requests to transmit the fourth type of data identified by 0,1,1 the device C requests to transmit the sixth type of data identified by 1,0,1.

In a situation of this kind, the communication channel 1 is engaged by the device A, which published the lowest number (001) on the bus 1.

Let it be supposed that multiple devices request access to the channel to transmit the same type of data:

the device A requests to transmit the second type of data identified by 0,0,1 the device B requests to transmit the fourth type of data identified by 0,1,1 the device C requests to transmit the sixth type of data identified by 1,0,1 the device D requests to transmit the second type of data identified by 0,0,1

In this case, the devices B and C lose the race and do not have access to the communication bus 1. Between the devices A and B the winner is the one whose data item (for both, the data item no. 001) has the lowest value, with a minimum value race among the values of the data to be transmitted.

In any case, applying the criterion of the race on the lowest value, the conflict among multiple devices is resolved and only a single data item is transmitted on the bus at a time, without corruption of the data to be transmitted.

When the device that has accessed the bus or communication channel 1 ends writing its data, an end marker 1,1,1 is transmitted on the bus. This end marker can be written by the time slot generator device $D_{TSG}$, or by the device that just finished writing its own data.

The presence of the string of recessive symbols on the bus allows a new device to access the bus, to share a new data item or parameter. The new device overwrites on the end marker 1,1,1 the identifying string of the type of data or parameter to be transmitted and the process begins again.

In this way, a sequence of shared data or parameters of undefined length can be transmitted on the communication bus 1, where each shared data item or parameter can be different from the other both in nature (type of data) and in length. Each device that transmits its own data item or parameter will provide a sequence of bits that identify the selected data ("selected data" section) and a sequence of bits that identify the length of the data ("symbol length" section).

The procedures described with reference to FIGS. 25 and 26 allow data sharing, i.e. they allow for example all devices to attempt to transmit on the bus their own data referred to a specific measured quantity, for example temperature or the supplied current in a current sharing system. With the criterion of selecting the maximum or the minimum among the shared data, sharing on the bus is allowed among all devices with the minimum value (or with the maximum value, using the 1's complement) among those measured by the various devices.

It was hypothesized that the management of the transmission of these data is performed by the device $D_{TSG}$. However, a situation could also be hypothesized in which a generic device $D_i$ requests access to the communication bus 1 to transmit a certain data item and that the same device defines the type of data and the length of the string of bits destined to encode the data to be transmitted.

In other situations or applications, it may be necessary for a device to interrogate another device from which information needs to be asked. In general, it may be necessary to carry out both the data sharing operation as described above, and an interrogation of one device to another device in the system.

In some embodiments of the invention, the data exchange procedure, activated "publishing" a dominant symbol "0" " in the field D of the command mask, activates a procedure comprising the transmission of shared data and subsequently the transmission of personal data, i.e. coming from a particular device and addressed to another particular device.

The transmission of the shared data can take place with one or the other of the two procedures described with reference to FIGS. 25 and 26.

To select the device to be interrogated, the following procedure can be followed. The device that carries out the interrogation, for example the time slot generator device $D_{TSG}$, generates a message of the type schematically shown in FIG. 10, into whose slot D is inserted the symbol "0" and in which this slot is followed by a sequence of slots that contain the shared data, according to one of the criteria illustrated with reference to FIGS. 25 and 26. The sequence of shared data is followed by a sequence of slots that contain the data that identify the virtual address of the device to which the message is addressed. In preferred embodiments of the invention, the virtual address is given by two blocks of digits, indicating the rack and the position in the rack, as described above in relation to the assignment of the virtual addresses.

In FIG. 27 the address is encoded in this way and it is defined by a rack number and by a position in the rack. In the illustrated example, the chosen address is defined by the sequence 0,1 (that identifies the rack) and 001 (that identifies the position in the selected rack). The sequence of bits defining the virtual address (in the example 2+3=5 bits) is followed by an acknowledgement bit or slot (Ack), i.e. a bit or slot where the device identified by the virtual address acknowledges receipt.

Supposing that the generic devices A, B, C, D have the following serial numbers and virtual address A: serial number SN 2345; address: rack 1, position 1
B: serial number SN 2355; address: rack 1, position 5
C: serial number SN 2297; address: rack 2, position 2
D: serial number SN 2295; address: rack 2, position 4, the virtual address 01; 001 indicated in the message of FIG. 27 identifies the device A (rack 1, position 1). When the device A reads this message generated by the device $D_{TSG}$ on the bus 1, it generates a dominant symbol "0" in the acknowledgement slot (Ack). The bottom part of FIG. 27 shows the consequent message which is read by all devices connected to the bus 1.

The acknowledgement slot (Ack) enables to save transmission time if no device is found to be associated to the selected address (rack 1, position 1) for any reason. In this case, the recessive symbol "1" remains in the slot Ack, which is interpreted as the absence of the device to which the message is addressed and hence the procedure stops. In some embodiments, if the interrogation at that given address yields a negative outcome (absence of a device) for a given number of consecutive times (e.g. twice), this address can be considered empty and used to be assigned to another device in the next address assignment race.

The device that is managing data transmission, for example the device $D_{TSG}$, after receiving the acknowledgement bit "0" in the slot Ack, requests the interrogated device to transmit its own serial number on the bus 1. See FIG. 28. For this purpose, it transmits a sequence of symbols "1" equal to the length of the serial number SN. In the example considered, this sequence is equal to 16 bit. The interrogated device A transmits in this time sequence the symbols "0" and "1" which describe its own serial number, for example in the illustrated case:

A: serial number SN 2345, corresponding to the sequence 0010 0011 0100 1010

Figure 28:
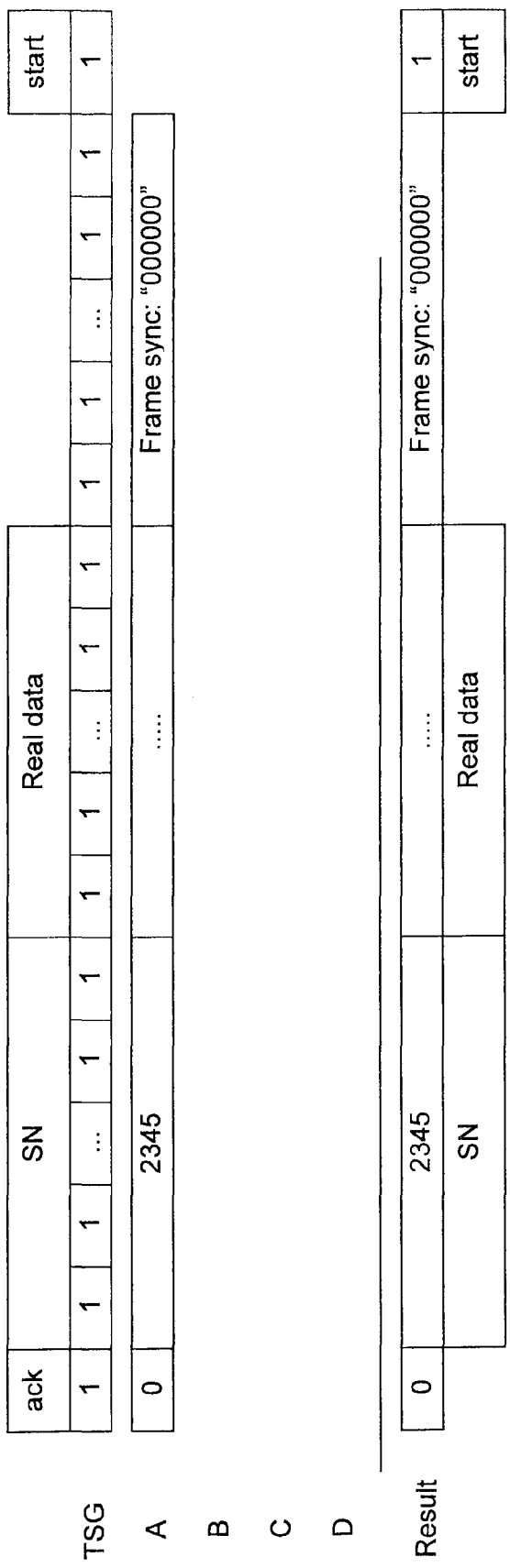

In succession to its own serial number SN, the device A that was interrogated transmits the requested information, i.e. the real data ("real data") indicated in the diagram of FIG. 28. Since only the device that is transmitting knows the length of the data to be transmitted, it will generate, at the conclusion of the transmission of its own data, a synchronisation frame ("frame sync"), to communicate that it concluded the transmission. In this case, then, the "frame sync" is not generated by the time slot generator device $D_{TSG}$, but rather by the device that ended the transmission of its own data. In this way, each device can transmit its own personal data without the time slot generator device $D_{TSG}$ having any knowledge of the nature and length of the transmitted data.

Alternatively, the following procedure can be followed to recognise the end of the personal data that are transmitted on the transmission bus. The time slot generator device $D_{TSG}$ continues to write (at the transmission frequency) a sequence of recessive symbols "1". These are overwritten by the data transmitted by the various devices that have access to the channel. When all data are transmitted, on the transmission channel 1 remains only the sequence of recessive symbols "1", which is then interpreted as a free channel.

The structure of the data ("real data") transmitted by a given device can be defined differently for different devices. That is, each device $D_1, D_2, D_3, \ldots D_n$ connected to the communication bus 1 can have its own protocol for the transmission of the personal data. Two generic devices connected to the communication channel can thus exchange data according to their own protocol, unknown to the other devices, including the time slot generator device $D_{TSG}$. In this case, it is necessary that the data transmitted by the generic device contain, as the first section, a portion of message that identifies the type of protocol used to encode the data and that then must be used for their encoding by the device to which such data are destined.

A possible protocol for the transmission of the personal data can be implemented similarly to the protocol for the transmission of shared data. In this case, the protocol provides for a list of possible personal data to be transmitted, each characterised by an identifier (IDpers). Each data item will have a given length, identified in a message section that follows the one containing the identifier of the type of data (IDpers) and that will contain a series of symbols indicating the length of the data. This section of the message follows the sequence of time slots containing the actual load, i.e. the data to be transmitted. The transmission of the data will therefore be constituted by a sequence of the following type:

IDPers-Length-Data-End Marker where the end marker is typically a sequence of recessive symbols "1". If multiple data of the same type or of different types need to be transmitted in sequence, the transmission sequence will be:

IDpers-Length-Data-IDpers-Length-Data-... End Marker

With a transmission of this kind, a third device (for example a master), different from the one that requested the data, for example the $D_{TSG}$, and from the one that is transmitting the personal data, can intervene requesting, for example, the retransmission of the same personal data.

In general, the interrogated device will transmit in sequence all its own personal data, according to a succession that can be chosen by the transmitting device itself.

The transmission of the personal data preceded by the transmission of the serial number SN of the selected device is important for multiple reasons, such as:
- the possible insertion of a master device on the bus 1 enables it to know from which device originate the data contained in the section "real data", even if this master is not continuously connected with the bus 1;
- the possible erroneous activation of the transmission of data from two different devices does not entail the corruption of the data, because there will simply be a "race" among the conflicting devices and the one with the lowest serial number SN will win, following the criteria described above.

As in the case described with reference to the "race" for the assignment of the virtual address, even in this case, transmitting the 1's complement of the serial number, the device with the lowest serial number can be made to win in the race, instead of the one with the highest serial number.

The procedure for the interrogation of the devices by the time slot generator device $D_{TSG}$ (or by any generic device) can be carried out for all devices that are known by the device $D_{TSG}$ or by the generic interrogating device, i.e. for all devices whereof the interrogating device knows the virtual address.

Situations may occur in which some devices are not interrogated, for example because they were inserted in the system after the last address assignment "race" was carried out or because for some reason the race left one or more devices without address. To prevent these devices from remaining outside the information flow, the entire interrogation sequence managed by the device $D_{TSG}$ can end with a "dummy" sequence. Each device that reads this sequence on the bus and that has not been interrogated in the preceding step understands that its address is not known to the device $D_{TSG}$ and requests the activation of a procedure for the assignment of virtual addresses as described above.

As mentioned above, in a preferred embodiment of the invention the personal data are always transmitted after a series of shared data. Alternatively, the personal data can be transmitted independently from the transmission of shared data. In a possible embodiment, for example there are two different fields DS, DP in the command mask instead of the field D alone and, depending on which field contains the dominant symbol "0", the transmission of shared data (DS=0) or the transmission of personal data (DP=0) is activated. However, this operating procedure may have some limitations, due to the fact that there must necessarily be a predetermined priority, defined by the position of the fields DS and DP in the command mask. The first field has priority over the second one. Therefore, if the field DS is placed first in the command mask, then the field DP, it may occur that the personal data can never be transmitted, or otherwise they are transmitted only when and if there are no shared data to transmit.

In other embodiments, a code different from any identifier code of shared data may be present, in case of personal data, in the field identifying the type of data (indicated as "$4^{th}$ data selected" in FIG. 26).

In the preferred embodiment of the invention, in which the personal data are transmitted after the shared data, the separation between the sequence of shared data and the sequence of personal data can be given by the end marker ("end of data") of the shared data, indicated in FIG. 26. If a given device activates the data exchange procedure writing a dominant symbol "0" in the field D of the command mask to transmit personal data, and if there are no other devices that attempt to transmit shared data at the same instant, the section of the shared data ends immediately with an end of data marker (sequence 111) and this end marker can be followed by the sequence of symbols relating to the transmission of the personal data, as described above.

The invention claimed is:

1. A method for the transmission of data among devices connected to a communication channel, the method comprising:
- one of said devices is designated as a time slot generator device and transmits a sequence of recessive symbols on said communication channel with a transmission frequency, each symbol defining a time slot of a sequence of time slots;
- said devices identifying the transmission frequency from the transmitted sequence of recessive symbols on said communication channel; and
- when one of said devices transmits on said communication channel, said device generates a sequence of symbols, synchronised with the sequence of time slots generated by said time slot generator device and comprising at least one dominant symbol, wherein the transmission of data on said transmission channel is synchronised through a synchronisation frame generated by one of the devices connected to said communication channel, wherein the synchronisation frame is followed by a sequence of bits forming a command mask, said command mask comprising a sequence of time slots, each containing at least one recessive symbol, and wherein any one or more of said devices requests access to the transmission channel by inserting a dominant symbol in one of the time slots of the command mask.

2. The method of claim 1, wherein each of said devices is connected to the communication channel with a transmission connection and a reception connection, the method further comprising:

said devices sample a voltage on the communication channel through said reception connection; and when a device requests to transmit on said communication channel, in synchronization with said time slots generated by said time slot generator device, a message comprising a recessive symbol in one of said time slots, the transmission is interrupted if a dominant symbol is present in said time slot on the communication channel.

3. The method of claim 1, wherein among multiple devices that attempt to transmit on said communication channel, a race is carried out on the basis of a criterion of maximum value or of minimum value among the sequences of symbols generated by said devices.

4. The method of claim 1, wherein said synchronisation frame is formed by a sequence of symbols containing at least some dominant symbols.

5. The method of claim 4, wherein said synchronisation frame is constituted by a consecutive sequence of dominant symbols and by a recessive symbol.

6. The method of claim 1, wherein at least some of the data transmissions are synchronised through a synchronisation frame generated by the time slot generator device.

7. The method of claim 1, wherein said command mask is generated by the time slot generator device.

8. The method of claim 1, wherein the time slots of the command mask are sorted according to a priority criterion, the priority being decreasing from the first to the last time slot of the command mask.

9. The method of claim 1, wherein an action corresponds to each time slot of the command mask and execution of the action is activated by the presence of a dominant symbol in the corresponding time slot of the command mask.

10. The method of claim 1, wherein when a device transmits a dominant symbol in a time slot of the command mask, the subsequent time slots of the command mask are not transmitted.

11. The method of claim 1, wherein said command mask comprises a series of time slots for the execution of one or more of the following commands: assignment to a device of the function as time slot generator device; selection of the transmission frequency; communication with a master device; execution of a race for the assignment of virtual addresses; and transmission of data among devices; configuration of a length of fields defining messages to be transmitted on the transmission channel.

12. The method of claim 1, wherein if a device connected to said communication channel does not detect any signal on said communication channel for a predetermined time, said device attributes itself the function of time slot generator device and starts to transmit on said communication channel a sequence of recessive symbols according to a transmission frequency.

13. The method of claim 12, wherein among several devices that started to perform the function of time slot generators, a single time slot generator device is selected through a race for the assignment of the time slot generator function.

14. The method of claim 13, wherein said race for the assignment of the time slot generator function is carried out in such a way that among multiple competing devices, each of which has a unique identifying number, the time slot generator device function is assigned to the device that has the lowest unique identifying number, or the highest unique identifying number.

15. The method of claim 1, wherein among several devices that started to perform the function of time slot generators, a single time slot generator device is selected through a race for the assignment of the time slot generator function; and at least one of the devices connected to the communication channel transmits on the communication channel a synchronization frame and a command mask, in which a time slot of the command mask, corresponding to a command for the execution of a race for the assignment of the time slot generator function contains the dominant symbol;

wherein each device that competes in the race for the assignment of the time slot generator device function transmits its own unique identifying number on the transmission channel; and wherein the race is won by the device that has the lowest unique identifying number.

16. The method of claim 15, wherein all devices that compete in the race for the assignment of the time slot generator device function transmit on the transmission channel said synchronizations frame and said command mask, in which a time slot, corresponding to the command for the execution of the race for the assignment of the time slot generator device function, contains the dominant symbol.

17. The method of claim 1, wherein:

among several devices that started to perform the function of time slot generators, a single time slot generator device is selected through a race for the assignment of the time slot generator function; and at least one of the devices connected to the communication channel transmits on the communication channel a synchronization frame and a command mask, in which a time slot of the command mask, corresponding to a command for the execution of a race for the assignment of the time slot generator function contains the dominant symbol;

wherein each device that competes in the race for the assignment of the time slot generator device function transmits a 1's complement of its own unique identifying number on the transmission channel; and wherein the race is won by the device that has the highest unique identifying number.

18. The method of claim 1, wherein the transmission frequency is selected through a race among a plurality of devices connected to said transmission channel.

19. The method of claim 1, wherein the transmission frequency is selected through a race among a plurality of devices connected to said transmission channel, and a request for the selection of a transmission frequency is carried out by a device connected to the transmission channel transmitting a dominant symbol in a time slot of the command mask corresponding to the request of a race for the selection of a transmission frequency, each device that participates in the race for the selection of the transmission frequency transmitting, after said dominant symbol, the maximum transmission frequency it is able to support, the lowest of said frequencies transmitted by the devices that participate in the race for the selection of the transmission frequency being set as transmission frequency.

20. The method of claim 1, wherein if on said communication channel a master device is connected, said master device takes control of the communication channel transmitting a dominant symbol in a time slot of the command mask corresponding to a request to access the channel by a master device.

21. The method of claim 20, wherein said master device transmits on said communication channel a message containing a synchronization frame and a command mask containing a dominant symbol in a time slot of said command mask corresponding to a command to transfer control of the communication channel to a master device.

22. The method of claim 20, wherein if multiple master devices simultaneously request access to the communication channel, a race for the assignment of the access to the communication channel among said master devices is carried out.

23. The method of claim 22, wherein the master device transmits on the communication channel a unique identifying number of the master device; and
wherein if multiple master devices simultaneously request access to the channel, said access is allowed to the master device that has the lowest unique identifying number, or to the master device that has the highest unique identifying number.

24. The method of claim 20, wherein the master device transmits on the communication channel a unique identifying number of the master device.

25. The method of claim 20, wherein the master device transmits on the communication channel a command after the transmission of said dominant symbol in the time slot of the command mask.

26. The method of claim 1, wherein to each device connected to said communication channel is assigned a unique virtual address, and wherein a device connected to said communication channel requests the assignment of a virtual address inserting a dominant symbol in a time slot of said command mask corresponding to a command for the assignment of virtual addresses.

27. The method of claim 26, wherein said device that requests the assignment of a virtual address selects a virtual address among a plurality of available virtual addresses, identified through a sequence of symbols transmitted by the time slot generator device, and
wherein if multiple devices request the assignment of the same virtual address, a race is carried out for the assignment of the requested virtual address, based on the unique identifying number of the devices that participate in the race, the virtual address being assigned to the device that has the lowest identifying number or the highest identifying number.

28. The method of claim 26, wherein each device has a unique identifying number and wherein to each unique identifying number of each device is associated a corresponding virtual address, and
wherein when multiple devices request the assignment of a same virtual address, said virtual address is assigned to the device that has the lowest, or highest, unique identifying number, by carrying out a race among said devices, in which said devices transmit on the communication channel their own unique identifying number, or the 1's complement of their own unique identifying number.

29. The method of claim 1, wherein to each device is assigned a virtual address defined as coordinates in a space with M dimensions, with M>1, each address being defined by a sequence of M numbers defining M coordinates in said space with M dimensions.

30. The method of claim 29, wherein when a device requests the assignment of a virtual address, the following steps are carried out: the time slot generator device transmits a sequence of symbols on the communication channel, identifying the coordinates of the available positions and the device that requested the assignment of the virtual address assigns itself an address selected among those defined by the coordinates of the available addresses.

31. The method of claim 29, wherein each device has a unique identifying number, and wherein if multiple devices choose the same virtual address, a race is carried out among said devices and the chosen virtual address is assigned to the device that has the lowest or highest unique identifying number.

32. The method of claim 29, wherein a plurality of devices simultaneously assign themselves a respective virtual address based on the coordinates of available positions transmitted by said time slot generator device.

33. The method of claim 1, wherein when a plurality of devices connected to said communication channel have to transmit data shared among said devices, on said communication channel is transmitted a command mask containing a dominant symbol in a time slot of said command mask corresponding to a shared data transmission request command and said time slot generator device transmits, subsequent to said command mask, a sequence of recessive symbols defining a sequence of time slots usable by said devices to transmit the shared data; and
wherein on the communication channel is transmitted the highest value or the lowest value among the shared data transmitted simultaneously in said sequence of time slots.

34. The method of claim 33, wherein said time slot generator device generates, subsequent to said sequence of recessive symbols defining the plurality of time slots usable to transmit the shared data, a sequence of recessive symbols defining a message end marker.

35. The method of claim 33, wherein said command mask is transmitted by said time slot generator device.

36. The method of claim 33, wherein said command mask is transmitted by one of the devices that have to transmit shared data on said communication channel.

37. The method of claim 1, wherein when a plurality of devices connected to said communication channel have to transmit data shared among said devices, on said communication channel is transmitted a command mask containing a dominant symbol in a time slot of said command mask corresponding to a shared data transmission request command and said time slot generator device transmits, subsequent to said command mask, a sequence of recessive symbols defining the type of data to be transmitted and the length of the data to be transmitted, followed by a sequence of recessive symbols, defining a plurality of time slots usable by said devices to transmit the shared data; and
wherein on the communication channel is transmitted the highest value or the lowest value among the shared data transmitted simultaneously in said sequence of time slots.

38. A 0 method for the transmission of data among devices connected to a communication channel, the method comprising:

one of said devices is designated as a time slot generator device and transmits a sequence of recessive symbols on said communication channel with a transmission frequency, each symbol defining a time slot of a sequence of time slots;

said devices identifying the transmission frequency from the transmitted sequence of recessive symbols on said communication channel; and when one of said devices transmits on said communication channel, said device generates a sequence of symbols, synchronised with the sequence of time slots generated by said time slot generator device and comprising at least one dominant symbol, wherein when a first device connected to said communication channel has to communicate with a second device connected to said communication channel, the first device transmits on said communication channel an address of said second device, and said second device transmits on said channel its own unique identifying number.

39. The method of claim 38, wherein said first device transmits, subsequent to said address, at least one acknowledgement field containing a recessive symbol, and wherein said second device transmits an acknowledgement of the message transmitted by the first device inserting a dominant symbol in said acknowledgement field.

40. The method of claim 38, wherein said second device transmits on said communication channel, in succession to its own unique identifying number, a sequence of data requested by said first device.

41. The method of claim 38, wherein if multiple devices transmit on the communication channel an address of a respective second device with which they have to communicate, only the device that transmitted the address having the lowest value or the highest value is transmitted on the communication channel.

* * * * *